United States Patent  
Tsukamoto et al.

(10) Patent No.: US 11,780,128 B2  
(45) Date of Patent: Oct. 10, 2023

(54) MOLDING MACHINE

(71) Applicant: THE JAPAN STEEL WORKS, LTD., Tokyo (JP)

(72) Inventors: Atsushi Tsukamoto, Shinagawa-ku (JP); Kenji Fukumoto, Shinagawa-ku (JP); Shizuo Jinno, Shinagawa-ku (JP); Hisanaga Tajima, Shinagawa-ku (JP); Hiroki Hasegawa, Shinagawa-ku (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/559,263

(22) Filed: Dec. 22, 2021

(65) Prior Publication Data

US 2022/0297357 A1    Sep. 22, 2022

(30) Foreign Application Priority Data

Mar. 16, 2021  (JP) .................................. 2021-042838  
Oct. 5, 2021  (JP) .................................. 2021-164268

(51) Int. Cl.
  *B29C 45/00*  (2006.01)
  *B29C 44/42*  (2006.01)

(52) U.S. Cl.
  CPC .................................. *B29C 44/424* (2013.01)

(58) Field of Classification Search
  None
  See application file for complete search history.

(56) References Cited

U.S. PATENT DOCUMENTS

2007/0273065 A1* 11/2007 Tokui ...................... B29C 45/66  
425/450.1

2010/0227014 A1* 9/2010 Kato ...................... B22D 17/26  
425/451.9

FOREIGN PATENT DOCUMENTS

| JP | H02-018009 A | 1/1990 |
| JP | H06-106542 A | 4/1994 |
| JP | H06-182839 A | 7/1994 |
| JP | H08-174614 A | 7/1996 |
| JP | 10-296810 A | 11/1998 |

(Continued)

OTHER PUBLICATIONS

Decision to Grant dated May 9, 2023 for corresponding Japanese Patent Application 2021-164268, with Machine Translation.

*Primary Examiner* — Alison L Hindenlang  
*Assistant Examiner* — Debjani Roy  
(74) *Attorney, Agent, or Firm* — Renner, Otto, Boisselle & Sklar, LLP

(57) ABSTRACT

A molding machine includes: a tie bar connected continuously to any one of a stationary platen and a movable platen, and including an engagement groove; a first engagement member configured to engage with or move away from the engagement groove of the tie bar; a second engagement member configured to engage with or move away from the engagement groove of the tie bar, and configured to be displaceable in an axial direction of the tie bar; a force transmission member located opposite the first engagement member across the second engagement member, and including a pressure surface to press the second engagement member and a through hole in which the tie bar is inserted; and a drive mechanism configured to use the force transmission member to cause the second engagement member to be displaceable in the axial direction of the tie bar with respect to the first engagement member.

3 Claims, 13 Drawing Sheets

(56) References Cited

FOREIGN PATENT DOCUMENTS

| JP | 2007-313721 A | 12/2007 |
|----|---------------|---------|
| JP | 2009-132097 A | 6/2009 |
| JP | 2009-132097 A | 6/2009 |
| JP | 2010-030158 A | 2/2010 |
| JP | 2011-031450 A | 2/2011 |

* cited by examiner (a) BEFORE NUT INSERTED (b) NUT INSERTED (a) BEFORE NUT INSERTED (b) NUT INSERTED (c) MOLD CLAMPING
PRESSURE INCREASED (d) CONPLETION OF PRESSURE INCREASE UNTIL PRESSURE PELEASE SECOND ENGAGEMENT MEMBER MOVED (e) CORE BACK CONTROL TIE BAR MOVED (f) STRONG MOLD OPENING CONTROL TIE BAR MOVED

MOLDING MACHINE

INCORPORATION BY REFERENCE

This application is based upon and claims the benefit of priority from Japanese patent applications No. 2021-042838, filed on Mar. 16, 2021, and No. 2021-164268 filed on Oct. 5, 2021, the disclosure of which are incorporated herein in its entirety by reference.

BACKGROUND

The present invention relates to a molding machine including: a mold opening/closing mechanism configured to cause a movable platen, to which a movable mold is attached, to move in a mold opening/closing direction with respect to a stationary platen to which a stationary mold is attached; and a mold clamping mechanism configured to clamp the stationary mold and the movable mold.

A molding machine is provided with: a mold opening/closing mechanism configured to cause a movable platen, to which a movable mold is attached, to move in a mold opening/closing direction with respect to a stationary platen to which a stationary mold is attached; and a mold clamping mechanism configured to clamp the stationary mold and the movable mold. The molding machine includes a tie bar including an engagement groove, and an engagement member configured to engage with or move away from the engagement groove of the tie bar; and in a state where the engagement member engages with the engagement groove of the tie bar, the mold clamping mechanism clamps or presses the stationary mold and the movable mold. However, the engagement member and the engagement groove have a small gap (backlash) therebetween, which in some cases causes an influence on accuracy of a molded product in a field of compression molding or core back molding. There is known a technique disclosed in JP 2009-132097 A where the backlash is removed or alternatively, is eliminated in a fixed condition.

As disclosed in claim 1 of JP 2009-132097 A, provided is a mold clamping device including mold clamping half nuts configured to engage with or move away from screws or ring grooves of a tie bar. The mold clamping device further includes another pair of additional half members restrained in moving in an axial direction of the tie bar with respect to the mold clamping half nuts and configured to relatively move in an opening/closing direction of the mold clamping half nuts. In the mold clamping device, when the mold clamping half nuts are closed to engage with the tie bar via the screws or the ring grooves, the additional half members are also closed to grip the tie bar. With this configuration, looseness (backlash) of the engagement area is removed, or the looseness (backlash) is eliminated in the fixed condition of the engagement area.

JP 2009-132097 A discloses, in FIG. 5 or others, a method where an actuator, provided on a vertical plate at a side of a movable platen, is used to cause the additional half members to move with respect to the mold clamping half nuts. JP 2009-132097 A additionally discloses, in FIG. 6 or others, a method where an actuator, provided on a vertical plate at an opposite side of the movable platen, is used to cause the additional half members to move with respect to the mold clamping half nuts.

SUMMARY

However, in the mold clamping device disclosed in JP 2009-132097 A, the actuator configured to cause the additional half members to move corresponds to a shaft member of cylindrical shape, e.g., a rod of a typical hydraulic cylinder or a screw shaft mechanism operated by an electric motor, the shaft member of cylindrical shape having a relatively small cross section area. Accordingly, it is difficult to stably apply force to an entire part of the additional half members. Another problem with the mold clamping device disclosed in JP 2009-132097 A is that the area described above has a relatively complex structure.

The present invention has been developed to solve such problems. An object of the present invention is to provide a molding machine where the structure is relatively simplified, or to provide a molding machine where force is applied to a second engagement member more stably to cause the second engagement member to displace in the axial direction of a tie bar with respect to a first engagement member. Other problems and new configurations are to be clarified based on this description and the appended drawings.

A molding machine according to an embodiment is provided with: a mold opening/closing mechanism configured to cause a movable platen, to which a movable mold is attached, to move in a mold opening/closing direction with respect to a stationary platen to which a stationary mold is attached; and a mold clamping mechanism configured to clamp the stationary mold and the movable mold.

The molding machine includes: a tie bar connected continuously to any one of the stationary platen and the movable platen, and including an engagement groove;
a first engagement member configured to engage with or move away from the engagement groove of the tie bar;
a second engagement member configured to engage with or move away from the engagement groove of the tie bar, and configured to be displaceable in an axial direction of the tie bar; a force transmission member located opposite the first engagement member across the second engagement member, and including a pressure surface to press the second engagement member and a through hole in which the tie bar is inserted; and a drive mechanism configured to use the force transmission member to cause the second engagement member to be displaceable in the axial direction of the tie bar with respect to the first engagement member.

With the molding machine according to the present disclosure, the structure of the molding machine is relatively simplified, or force is applied to the second engagement member more stably to cause the second engagement member to be displaceable in the axial direction of the tie bar.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, embodiments will be specifically described in detail with reference to the drawings. Note that, the present invention is not limited to the embodiments described below. In addition, for clarification of description, the descriptions below and the drawings are appropriately simplified. Further, hatching is omitted in some parts so as not to complicate the drawings.

Injection Molding Machine

Figure 1:
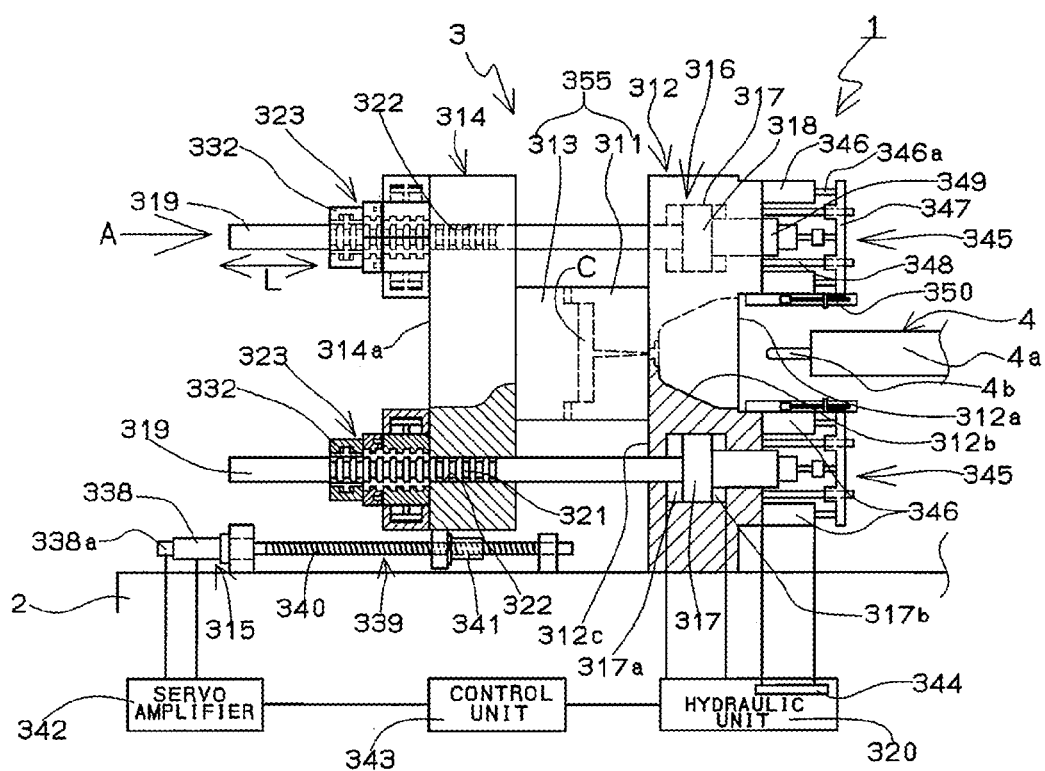
FIG. 1 is a side view of an injection molding machine according to a first embodiment.

An injection molding machine 1 according to a first embodiment of the present invention will be described with reference to FIG. 1. FIG. 1 is a side view of the injection molding machine 1. The injection molding machine 1 as a type of a molding machine includes a base 2, a mold clamping unit 3, and an injection unit 4, and the mold clamping unit 3 and the injection unit 4 are located on the base 2. The mold clamping unit 3 includes a stationary mold 311, a stationary platen 312, a movable mold 313, a movable platen 314, two mold opening/closing mechanisms 315, and four mold clamping cylinders 317 as mold clamping mechanisms 316. Each of the two mold opening/closing mechanisms 315 is configured to cause the movable platen 314, to which the movable mold 315 is attached, to move with respect to the stationary platen 312 to which the stationary mold 311 is attached. Each of the four mold clamping cylinders 317 as the mold clamping mechanisms 316 is configured to clamp the stationary mold 311 and the movable mold 313 (note that, FIG. 1 illustrates the mold opening/closing mechanism 315 and the mold clamping mechanisms 316 on the front side only). The injection unit 4 includes a screw (not illustrated) and others inside a heating cylinder 4a, and enables molding such as foam molding.

The stationary platen 312 is fixed on the base 2, and is provided, at a center of its counter mold attachment surface 312a, i.e., a surface opposite a mold attachment surface of the stationary platen 312, with a conical portion 312b. The conical portion 312b is to have a nozzle 4b of the injection unit 4 inserted therein, and has at its center a hole, through which the nozzle 4b is to be connected to the stationary mold 311. In addition, inside the stationary platen 312, the mold clamping cylinders 317 as the mold clamping mechanisms 316 are respectively located near four corners. Each of the mold clamping cylinders 317 includes a piston 318 and a rod at a forward side of the piston 318, and the rod corresponds to a tie bar 319 as a shaft member of the present invention. Accordingly, in the present invention, the tie bar 319 as the shaft member is continuously connected to the stationary platen 312. Note that, in the first embodiment, the mold opening side is referred to as a forward side of the tie bar 319, and the mold closing side is referred to as a rearward side of the tie bar 319. Each of the mold clamping cylinders 317 is a double acting cylinder, including a mold clamping-side oil chamber 317a at the forward side of the piston 318 and a strong mold opening-side oil chamber 317b at the rearward side of the piston 318. Each of the mold clamping cylinders 317 is connected to a hydraulic unit 320 that includes a valve, a sensor, a pump, a tank, and others.

Figure 2:
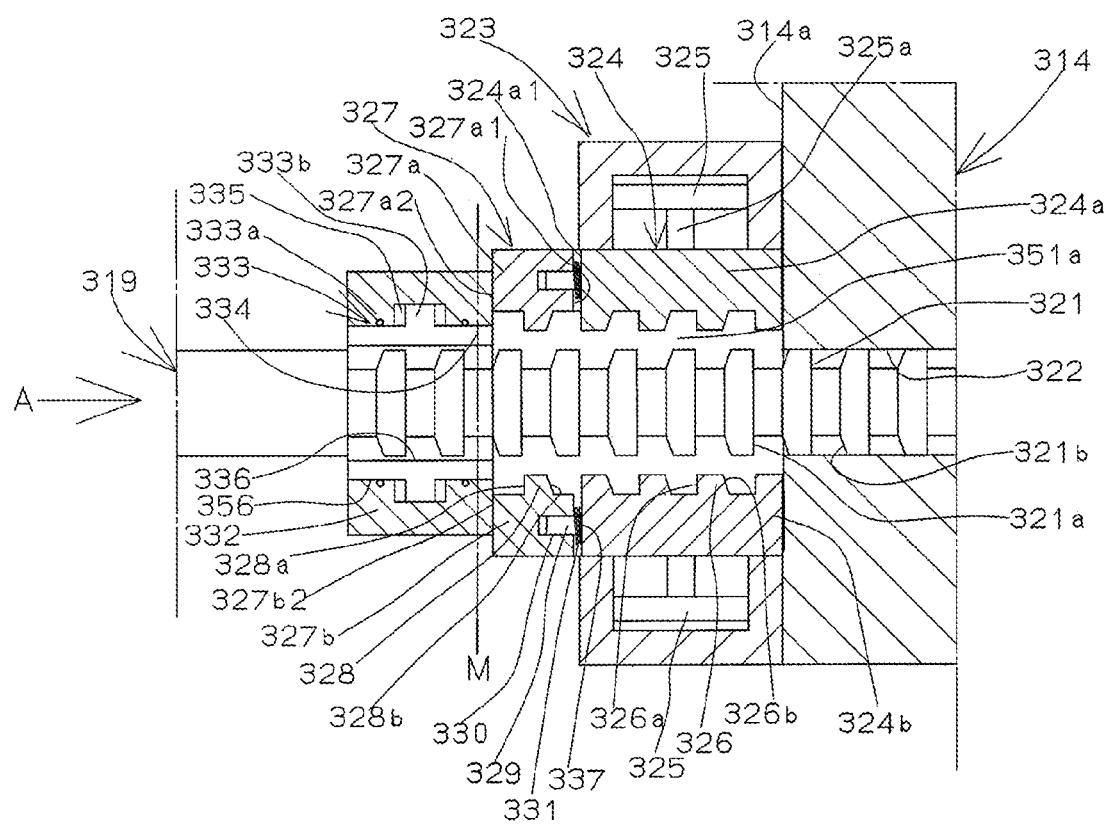
FIG. 2 is an enlarged view of a main part of the injection molding machine according to the first embodiment, and illustrates a state before an engagement mechanism engages.
Figure 4:
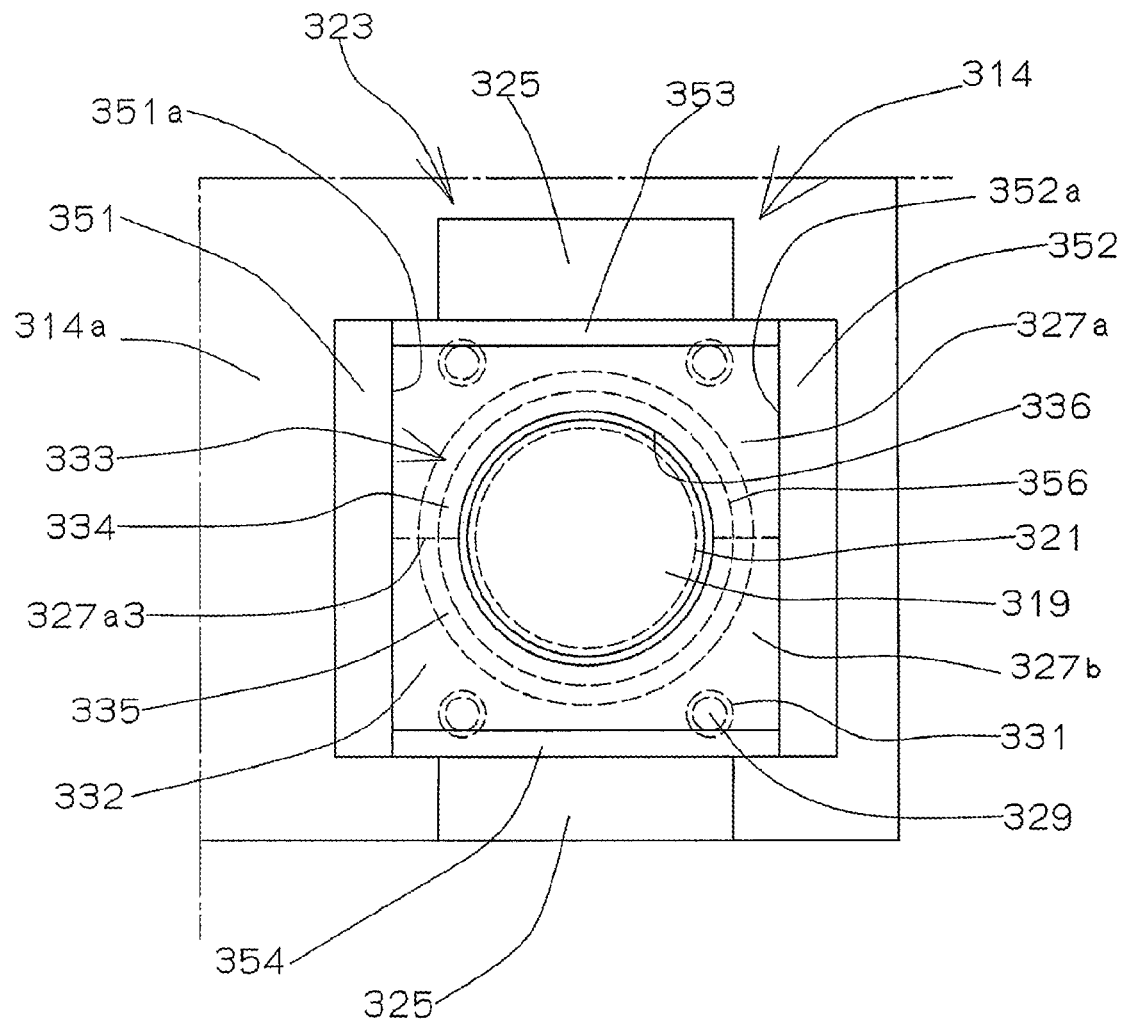
FIG. 4 is an enlarged view of the main part when viewed in a direction of A in FIG. 1.

Each of the tie bars 319 has, on its outer circumference near its tip, a plurality of engagement grooves 321 that are arranged at equal pitch for a predetermined length in a mold opening/closing direction. As illustrated in FIGS. 2 and 4, each of the engagement grooves 321 has a mold clamping-side abutting surface 321a, a strong mold opening-side abutting surface 321b, and a bottom surface 321c. The mold clamping-side abutting surface 321a is arranged perpendicularly to an axial direction L of the tie bar 319, the strong mold opening-side abutting surface 321b is arranged diagonally to the axial direction L of the tie bar 319, and between the mold clamping-side abutting surface 321a and the strong mold opening-side abutting surface 321b, the bottom surface 321c is arranged parallel to the axial direction L. Alternatively, the strong mold opening-side abutting surface 321b of each of the engagement grooves 321 may be arranged perpendicularly to the axial direction L. Further, the engagement grooves 321 may be continuous screw grooves. Each of the tie bars 319 is inserted in an insertion hole 322 that is disposed near a corresponding one of four corners of the movable platen 314. Note that, the mold clamping unit 3 may have, on a side of a counter mold attachment surface 314a of the movable platen 314 on the base 2, a tie bar holder for holding each of the tie bars 319 at a constant distance from the movable platen 314.

In the movable platen 314, engagement mechanisms 323 are respectively provided for the tie bars 319 at both sides of the insertion holes 322 near the four corners on the counter mold attachment surface 314a. Each of the engagement mechanisms 323 is also referred to as a half nut, and includes a first engagement member 324 and a second engagement member 327 in the present invention.

On the base 2, the two mold opening/closing mechanisms 315 are disposed to cause the movable platen 314, to which the movable mold 313 is attached, to move closer to or away from the stationary platen 314 to which the stationary mold 311 is attached. Each of the mold opening/closing mechanisms 315 is a servo mechanism that uses a servo motor 338 and a ball screw mechanism 339 in the first embodiment. More specifically, the servo motor 338 is fixed to a bracket on an upper surface of the base 2, and the servo motor 338 includes a rotary encoder 338a as a position detection mechanism. The servo motor 338 including the rotary encoder 338a is connected to a servo amplifier 342 and a control unit 343. The control unit 343 is also connected to the hydraulic unit 320.

The ball screw mechanism 339 includes a ball screw 340, and one end and the other end of the ball screw 340 are respectively rotatably attached via bearings to the brackets on the base 2 such that an axial direction of the ball screw 340 is aligned with the mold opening/closing direction. The servo motor 338 has a drive shaft that is directly connected or connected via a belt to the ball screw 340, so that the ball screw 340 is driven by the servo motor 338 to be rotatable. At a lower part of a side surface or on a lower surface of the movable platen 314, a ball screw nut 341 is fixed via a bracket, and the ball screw 340 is inserted in the ball screw nut 341. With these mechanisms, the servo motor 338 in each of the two mold opening/closing mechanisms 315 drives to cause the movable platen 314 to move in the mold opening/closing direction. The rotary encoder 338a detects a position of the movable platen 314, and the servo amplifier 342 or the like causes the movable platen 314 to be controlled in speed (and position) under closed-loop control. The servo mechanisms as the mold opening/closing mechanisms 315 may be two closed-loop controllable hydraulic cylinders using servo valves.

The position of the movable platen 314 with respect to the stationary platen 312 or a position of the movable mold 313 with respect to the stationary mold 311 may be measured by other position detection mechanisms, e.g., a linear scale, in addition to the rotary encoder 338a. Note that, as has been described with the mechanisms in the first embodiment, the two mold opening/closing mechanisms 315 are disposed on the base 2, which provides certain reasonableness in terms of arrangement and wiring of the servo motor 338 and the ball screw mechanism 339 as heavy objects, or in terms of costs associated therewith. However, the number of the mold opening/closing mechanisms 315 is not limited to two and may be one, or alternatively, a plurality of the mold opening/closing mechanisms may be provided.

The mold clamping unit 3 includes, in addition to the mold clamping cylinders 317, four tie bar moving mechanisms 345 that are respectively configured to move the tie bars 319 for a constant distance. The number of the tie bar moving mechanisms 345 is four, corresponding to that of the tie bars 319 (note that, only two of the tie bar moving mechanisms 345 are illustrated in FIG. 1). Each of the mold clamping cylinders 317 has a rod 349 fixed on the rearward side of the piston 318, and at a tip of the rod 349, a joint plate 347 is attached perpendicularly and directly or via a joint or others. The stationary platen 312 has a plurality of guide bars 348 attached to the counter mold attachment surface 312a in a direction parallel to the rod 349, and the plurality of guide bars 348 are inserted in insertion holes of the joint plate 347. Further, at both sides of the rod 349 on the counter mold attachment surface 312a, tie bar moving cylinders 346 are attached in parallel to the rod 349. Each of the tie bar moving cylinders 346 has a rod 346a on the side of the counter mold attachment surface 312a, and the rod 346a is attached to the joint plate 347, so that the rod 349 and the rod 346a are integrally connected.

Each of the tie bar moving cylinders 346 is a double rod hydraulic cylinder, and also includes a rod (not illustrated) on a side of a mold attachment surface 312c, so that oil chambers at both sides have pressure increasing surfaces of equal area. The tie bar moving cylinders 346 are connected to the hydraulic unit 320, and are under the closed-loop control to be supplied with hydraulic oil via a valve 344 as a flow rate controllable valve. The valve 344 as the flow rate controllable valve may be a servo valve or any one of other variable flow rate control valves. With these mechanisms, in each of the tie bar moving mechanisms 345, the tie bar moving cylinders 346 are operated such that the joint plate 347 is guided by the guide bars 348 to move in forward and rearward directions. Concurrently, the rod 349, the piston 318, and the tie bar 319, each connected to the joint plate 347, move in the forward and rearward directions. Between the stationary platen 312 and the joint plate 347, a position sensor 350 such as a linear scale is attached, and the position sensor 350 measures a position of the tie bar 319 with respect to the stationary platen 312. When each of the tie bar moving mechanisms 345 adopts a hydraulic mechanism, the number of the tie bar moving cylinders is not limited, and hydraulic cylinders may be provided inside the stationary platen 312. Alternatively, each of the tie bar moving mechanisms 345 may be an electric mechanism, as long as the tie bar moving mechanisms 345 are under the closed-loop control (in position or speed). In this case, a servo motor and a ball screw mechanism may be used, and further, a toggle mechanism or a wedge mechanism may be used in combination.

Engagement Mechanism

Figure 3:
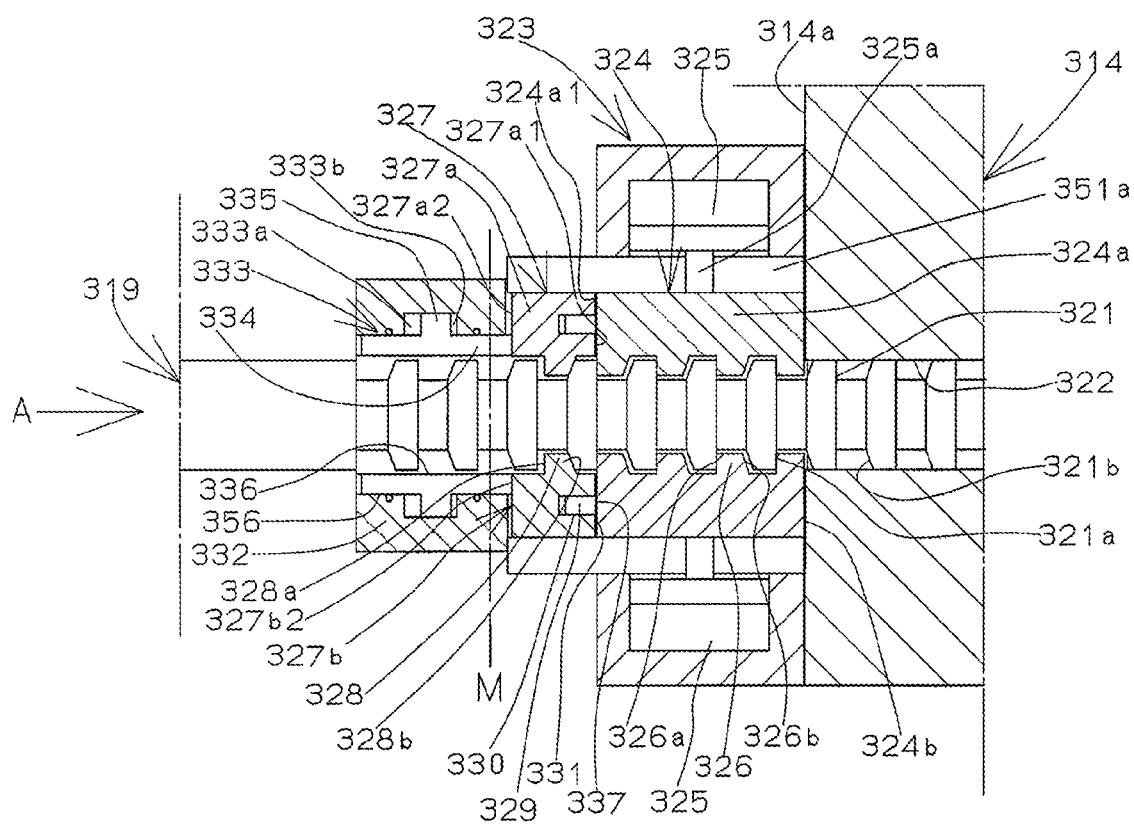
FIG. 3 is an enlarged view of the main part of the injection molding machine according to the first embodiment, and illustrates a state under core back control.

Next, each of the engagement mechanisms 323 will be described with reference to FIGS. 2 to 4. FIG. 2 is an enlarged view of a main part of the injection molding machine according to the first embodiment, and illustrates a state before the engagement mechanism engages. FIG. 3 is an enlarged view of the main part of the injection molding machine according to the first embodiment, and illustrates a state under core back control. FIG. 4 is an enlarged view of the main part when viewed in a direction of A in FIG. 1.

At both sides of each of the insertion holes 322 of the movable platen 314, holding members 351 and 352 are fixed as parts of a case of the engagement mechanism 323. On inner sides of the holding members 351 and 352, guide portions 351a and 352a are provided relatively closer to the movable platen 314, and the first engagement member 324 is arranged to be sandwiched between the guide portions 351a and 352a. The first engagement member 324 includes a pair of a first engagement member 324a and a first engagement member 324b. The holding members 351 and 352 are connected at upper ends thereof with a joint portion 353, and the joint portion 353 has a hydraulic cylinder 325 attached thereto. The hydraulic cylinder 325 is an actuator as a drive mechanism to drive the engagement mechanism 323 in an opening/closing direction of the engagement mechanism 323, and has a rod 325a fixed to a rear part of the first engagement member 324a. In other words, the drive mechanism of the present invention is fixedly attached to the stationary platen 312 or the movable platen 314.

Similarly, the holding members 351 and 352 are connected at lower ends thereof with a joint portion 354, and the joint portion 354 has a hydraulic cylinder 325 attached thereto. The hydraulic cylinder 325 is the actuator to drive the engagement mechanism 323 in the opening/closing direction, and has a rod 325a fixed to a rear part of the first engagement member 324b. With the structures described above, these hydraulic cylinders 325 are operated to cause the pair of the first engagement members 324a and 324b to advance toward or retreat from the engagement grooves 321 of the tie bar 319. The actuator for driving each of the engagement mechanisms 323 in the opening/closing direction may be an electric motor such as a servo motor. Further, the actuator for driving each of the engagement mechanisms 323 in the opening/closing direction is not limited thereto. The plurality of engagement mechanisms 323 may be operated by one actuator such as the hydraulic cylinder or the electric motor. In a case where the plurality of engagement mechanisms 323 are actuated by the one actuator such as the hydraulic cylinder or the electric motor, the engagement mechanisms 323 may adjoin each other horizontally and be operated by the one actuator, or alternatively, may adjoin each other perpendicularly and be operated by the one actuator.

In the engagement mechanism 323, the first engagement member 324a and the first engagement member 324b as the first engagement member 324 are block-shaped nut members. Each of the first engagement members 324a and 324b has, at its inner periphery opposing the tie bar 319, a plurality of engagement teeth 326. The plurality of engagement teeth 326 of the first engagement members 324a and 324b are shaped in correspondence to the mold clamping-side abutting surfaces 321a and the strong mold opening-side abutting surfaces 321b of the tie bar 319. Each of the engagement teeth 326 of the first engagement members 324a and 324b has a mold clamping-side abutting surface 326a arranged perpendicularly to the axial direction L of the tie bar 319, and a strong mold opening-side abutting surface 326b arranged diagonally to the axial direction L of the tie bar 319. The first engagement member 324a has a flat surface portion as a lower surface on each side of the inner periphery of the first engagement member 324a. When the first engagement member 324a and the first engagement member 324b are closed, the flat surface portion of the first engagement member 324a is to abut or to be disposed at a small distance opposite a flat surface portion of the first engagement member 324b. When the hydraulic cylinders 325 as the drive mechanisms are operated to cause the first engagement members 324a and 324b to advance, the movable platen 314 is to be engageable via the engagement teeth 326 engaging with the engagement grooves 321 of the tie bar 319. Note that, as long as the engagement teeth 326 of the first engagement members 324a and 324b are shaped in correspondence to the engagement grooves 321 of the tie bar 319, the strong mold opening-side abutting surface 326b may be arranged perpendicularly. As illustrated in FIG. 1, the opening/closing direction of each of the engagement mechanisms 323 with respect to the tie bar 319 corresponds to a top to bottom direction in which the pair of the first engagement members 324a and 324b move. Alternatively, the opening/closing direction of each of the engagement mechanisms 323 may be horizontal or other directions.

Further, as illustrated in FIGS. 2 and 3, the second engagement member 327 as part of the engagement mechanism 323 of the present invention is disposed to be sandwiched between sliding surfaces on inner sides of the holding members 351 and 352, and on a side relatively farther from the movable platen 314. The second engagement member 327 includes a second engagement member 327a and a second engagement member 327b that are block-shaped nut members. Similarly to the first engagement members 324a and 324b, each of the second engagement members 327a and 327b has engagement teeth 328 opposite the engagement grooves 321 of the tie bar 319. In other words, each of the engagement teeth 328 of the second engagement members 327a and 327b has a mold clamping-side abutting surface 328a arranged perpendicularly to the axial direction L of the tie bar 319, and a strong mold opening-side abutting surface 328b arranged diagonally to the axial direction L of the tie bar 319. The second engagement member 327a has a flat surface portion 327a3 as a lower surface on each side of an inner periphery of the second engagement member 327a. When the second engagement member 327a and the second engagement member 327b are closed, the flat surface portion 327a3 is to abut a flat surface portion of the second engagement member 327b. Note that, in FIGS. 2 and 3, for convenience of description, the first engagement member 324 and the second engagement member 327 as the engagement mechanism 323 respectively have less engagement teeth than the actual engagement teeth. However, in most cases, the number of the engagement teeth 328 of the second engagement member 327 is smaller than that of the engagement teeth 326 of the first engagement member 324.

With regard to a relationship between the first engagement member 324 and the second engagement member 327, the upper engagement members (324a and 327a) and the lower engagement members (324b and 327b) respectively share the same shapes. Thus, a relationship between the first engagement member 324a and the second engagement member 327a as one of the pairs will be described. The second engagement member 327a of the second engagement member 327 is displaceable in the axial direction L of the tie bar 319 with respect to the first engagement member 324a of the first engagement member 324. More specifically, a connecting guide bar 329 of a cylindrical shape is fixed to a side surface 324a1 of the first engagement member 324a in the axial direction L of the tie bar 319, and a tip of the connecting guide bar 329 is inserted in a guide hole 330 that is formed from a side surface 327a1 of the second engagement member 327a in the axial direction L of the tie bar 319. The connecting guide bar 329 between the first engagement member 324a and the second engagement member 327a has, on its outer circumference, a spring 331 attached thereto. The spring 331 has its end surface abutting the side surface 324a1 of the first engagement member 324a and the side surface 327a1 of the second engagement member 327a. Note that, the number of sets of the connecting guide bars 329 and the springs 331 between the first engagement member 324a and the second engagement member 327a is not limited, but preferably a plurality of sets are provided. The connecting guide bars 329 and the springs 331 may be provided at other positions. Alternatively, the second engagement member 327a may have a connecting guide bar attached thereto, and the first engagement member 324a may have a guide hole therein.

With these mechanisms, when the rod 325a of the hydraulic cylinder 325 as the actuator of the engagement mechanism 323 is operated to advance, the first engagement member 324a and the second engagement member 327a concurrently advance toward the engagement grooves 321 of the tie bar 319. On the other hand, when the rod 325a of the hydraulic cylinder 325 is operated to retreat, the first engagement member 324a and the second engagement member 327a concurrently retreat from the engagement grooves 321 of the tie bar 319. The first engagement member 324a and the second engagement member 327a need not be connected via the connecting guide bar 329, and a dedicated drive mechanism may be provided to cause the second engagement member 327 to advance toward or retreat from the engagement grooves 321 of the tie bar 319. In this case, the type or the number of the drive mechanisms is not limited.

Each of the holding member 351 and holding member 352, which is formed integrally with the movable platen 314, has, at its tip (on the side relatively farther from the movable platen 314), a block 332 fixed thereto; and an actuator is to be attached on the block 332, the actuator as a drive mechanism to cause the second engagement member 327 to be displaceable in the axial direction L of the tie bar 319 with respect to the first engagement member 324. Accordingly, the block 332 moves neither in the axial direction L of the tie bar 319 nor perpendicularly to the axial direction L of the tie bar 319, with respect to the movable platen 314. The block 332 has the tie bar 319 inserted therein, and a hydraulic cylinder 333, i.e., the actuator described above, is provided on a side where the tie bar 319 is inserted. The hydraulic cylinder 333 is a double acting cylinder and includes, as its rod, a force transmission member 334 having a cross section M perpendicular to the axial direction L of the tie bar 319. As illustrated in FIG. 4, the cross section M is ring-shaped with a predetermined width. The hydraulic cylinder 333 also includes a piston 335 that forms a forward oil chamber 333a and a rear oil chamber 333b, and the piston 335 has a pressure increasing surface that is similarly ring-shaped with a predetermined width as illustrated in FIG. 4. The force transmission member 334 extends to both sides of the piston 335 of the hydraulic cylinder 333 and has, at its forward and rearward sides, the same cross sectional shape. Between an outer circumferential face 356 of the force transmission member 334 and an inner hole of the block 332, a ring-shaped seal member is fitted to seal the forward oil chamber 333a and the rear oil chamber 333b such that the hydraulic oil does not leak. With this configuration, the structure of the hydraulic cylinder 333 is simplified, and the hydraulic oil is less prone to leak.

As illustrated in FIG. 4, the force transmission member 334 as a cylinder rod of a cylindrical shape has an inner circumference 336 formed as a hole in which the tie bar 319 is inserted. The inner circumference 336 of the force transmission member 334 is slighter greater in diameter than the outer circumference of the tie bar 319. The inner circumference 336 of the force transmission member 334 is disposed at a small distance opposite an outer periphery of a projection top surface 321d of each of the engagement grooves 321 of the tie bar 319. The force transmission member 334 of this embodiment has the cross section M perpendicular to the axial direction L of the tie bar 319, and the cross section M has an inner circumference of a circular shape. With this configuration, the inner circumference 336 presumably has a shape at least substantially similar to that of the outer circumference of the tie bar 319. With this structure, the hydraulic cylinder 333 as the drive mechanism is configured not to move in the direction to engage with or move away from the engagement grooves 321 of the tie bar 319.

Note that, the cross section M of the inner circumference 336 of the force transmission member 334, the cross section M perpendicular to the axial direction L of the tie bar 319, need not necessarily be formed in a complete circular shape, and may have an elliptical shape or a circular shape where spline grooves are formed. Further, the force transmission member 334 as the actuator may have a cross section of a ring shape that has partially a slit, and the cross section of the inner circumference may have a circular arc shape. Alternatively, the number of the hydraulic cylinders 333 may be two, and two force transmission members (as rods of the two hydraulic cylinders 333), each having a cross section substantially semicircular or fan-shaped with a predetermined width and having an inner circumference of circular arc shape, may respectively press the second engagement members 327a and 327b to transmit force to the second engagement members 327a and 327b. In a case where the inner circumference 336 of the force transmission member 334 has the cross section of circular arc shape, the cross section may have a plurality of curvatures. Further, as long as a major part of the cross section is circular arc-shaped, the cross section may partially have a non-circular arc shape such as a straight line. Alternatively, with regard to the actuator used here, the actuator corresponding to claim 3, a single acting or a double acting hydraulic cylinder, each including a typical rod of circular shape, may be applied, or the actuator may be an electric motor, e.g., a servo motor, or an electric cylinder. In a case where the electric motor or the electric cylinder is used as the actuator, the force transmission member as the drive mechanism may have the cylindrical shape; and the cross section M of the force transmission member, the cross section M perpendicular to the axial direction L of the tie bar 319, may have the inner circumference of a partially circular or circular arc shape.

The force transmission member 334 of the cylindrical shape in the hydraulic cylinder 333 has an abutting surface 337 as a tip surface that is a flat surface parallel to a side surface 327a2 of each of the second engagement members 327a and 327b, the side surface 327a2 located farther from the movable platen. The abutting surface 337 is not connected to the side surface 327a2 of the second engagement member 327a located farther from the movable platen, so that when the force transmission member 334 is drawn away (from the second engagement member 327a), the abutting surface 337 and the side surface 327a2 has a gap therebetween. Accordingly, the hydraulic cylinder 333 and the force transmission member 334 do not move perpendicularly to the axial direction L of the tie bar 319 in other words as shown in FIGS. 2-4 and 5A-5C the force transmission member 334 is held in a state in which the force transmission member 334 moves in a direction parallel to the axial direction L of the tie bar 319, while only the second engagement members 327a and 327b together with the first engagement members 324a and 324b advance toward or retreat from the engagement grooves 321 of the tie bar 319. The force transmission member 334 is not directly fixed to the second engagement members 327a and 327b, so that when the force transmission member 334 presses the side surfaces 327a2 and 327b2 of the second engagement members 327a and 327b, the second engagement members 327a and 327b are respectively caused to move in the axial direction of the tie bar with respect to the first engagement members 324a and 324b. When the force transmission member 334 does not press the second engagement members 327a and 327b, resilient force of the springs 331 causes the second engagement members 327a and 327b to return to the original positions. As has been described above, the force transmission member 334 is not directly fixed to the second engagement members 327a and 327b. In this state, the abutting surface 337 of the force transmission member 334 may abut the second engagement members 327a and 327b at all times to be slidable. Further, with regard to the force transmission member 334 configured not to move perpendicularly to the axial direction L of the tie bar 319, as long as the second engagement members 327a and 327b are configured to move to engage with or move away from the engagement grooves of the tie bar, the force transmission member 334 may engage with the second engagement members 327a and 327b.

Method for Controlling Mold Clamping Unit and Method for Molding Foam Molded Product Next, a method for controlling the mold clamping unit 3 of the injection molding machine 1 according to the first embodiment and a method for molding a foam molded product will be described with reference to FIGS. 2, 3, 5A, 5B, 5C, 5D, 5E, and 5F. Note that, in FIGS. 5A, 5B, 5C, 5D, 5E, and 5F, for convenience of description, the first engagement members 324a and 324b as the first engagement member 324 and the second engagement members 327a and 327b as the second engagement member 327 respectively have only one engagement tooth, while a plurality of the engagement teeth 326 and the number of the engagement teeth 328 actually exist. In the first embodiment, the mold clamping unit 3 has a molding mold 355 attached thereto. The molding mold 355 is also referred to as a spigot mold where, even when the position of the movable mold 313 as a core mold changes in the mold opening/closing direction with respect to the stationary mold 311 as a cavity mold, the molding mold 355 is held in a state where a volume of a cavity C is modified. The molding mold 355 may be a mold used in other methods of core back molding.

When the molding mold 355, configured to be under the core back control as described above, has been attached to the stationary platen 312 and the movable platen 314 of the mold clamping unit 3, a thickness of the molding mold 355 is measured. Subsequently, by referring to the thickness of the molding mold 355, each of the tie bar moving mechanisms 345 is operated to adjust positions of the piston 318 and the tie bar 319 of the mold clamping cylinder 317 in the corresponding mold clamping mechanism 316, so that the engagement grooves 321 of each of the tie bars 319 are positioned to be engageable with the corresponding engagement mechanism 323 when the movable platen 314 is in a mold closed state.

In the injection unit 4, a resin material supplied for the foam molding is plasticized in the heating cylinder 4a and prepared for use. The foam molding in the present invention may be chemical foam molding where a foaming agent is added, or alternatively, may be physical foam molding where gas is injected. The physical foam molding includes supercritical foam molding.

Operation of Mold Clamping Unit

Figure 5A:
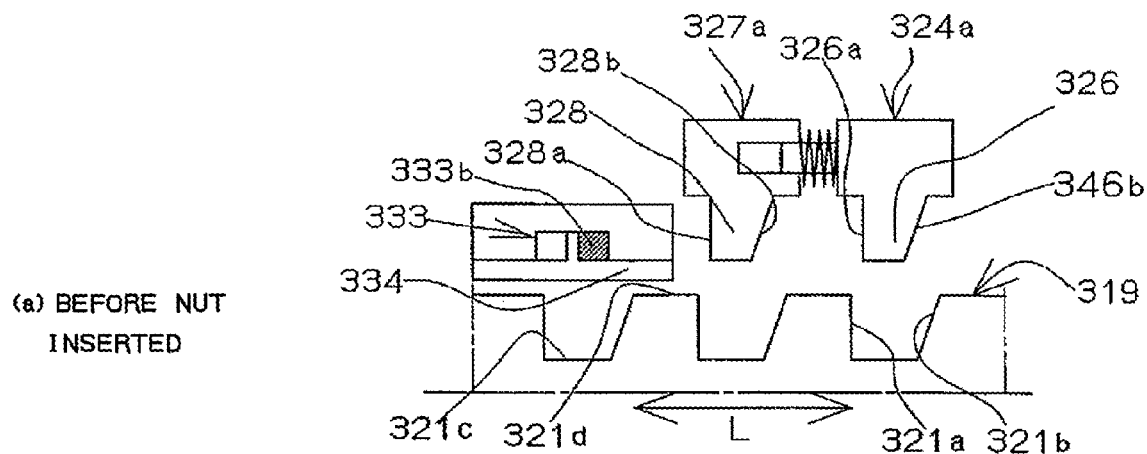
FIGS. 5A, 5B, 5C, 5D, 5E, and 5F each illustrate an operation in a first half of processes in the first embodiment.
Figure 5B:
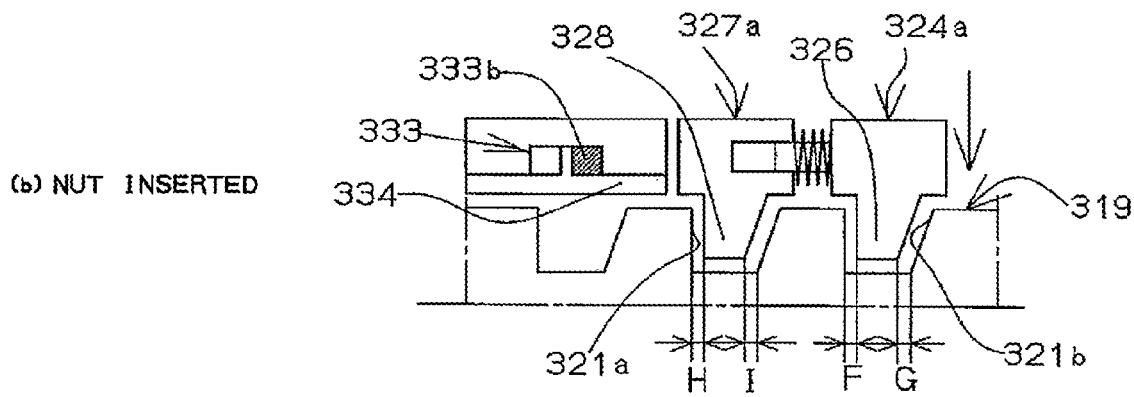
Figure 5C:
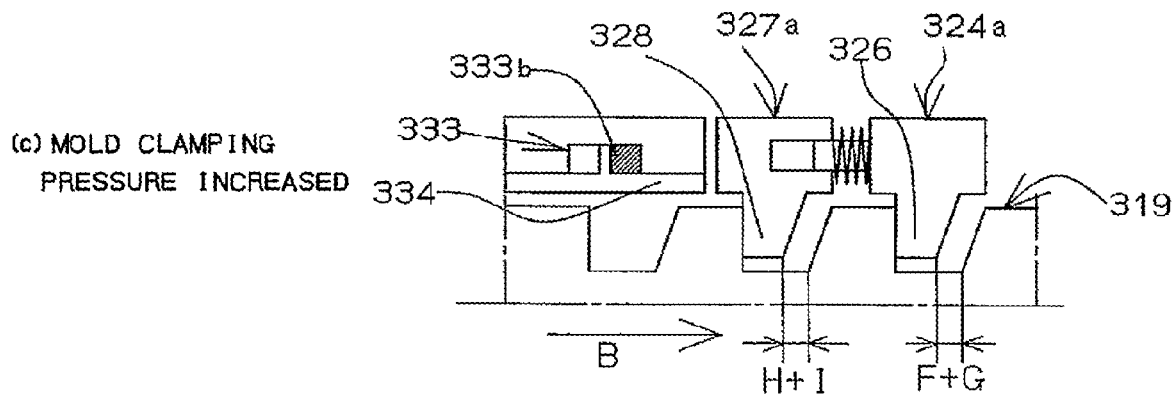
Figure 5D:
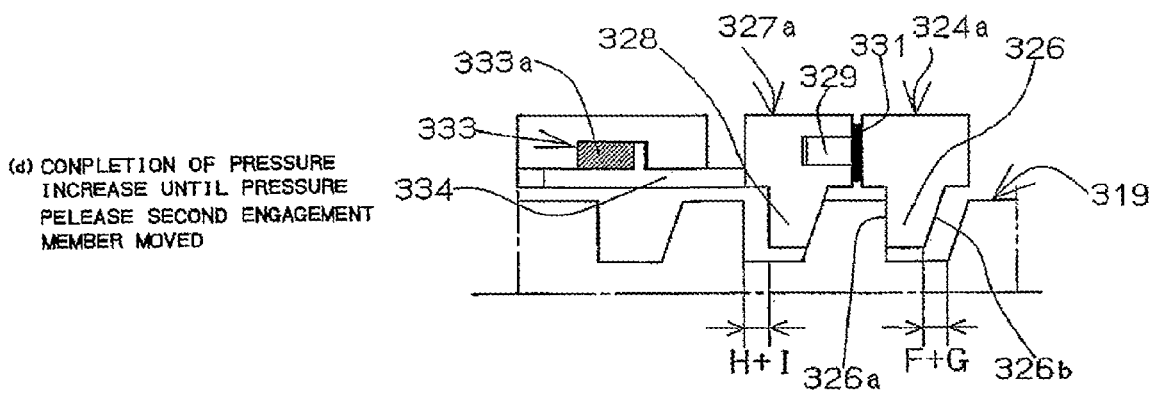
Figure 5E:
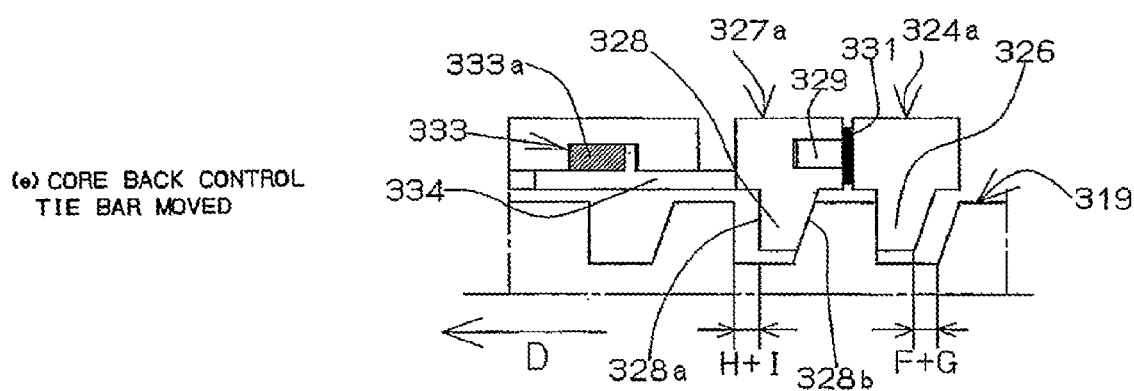
Figure 5F:
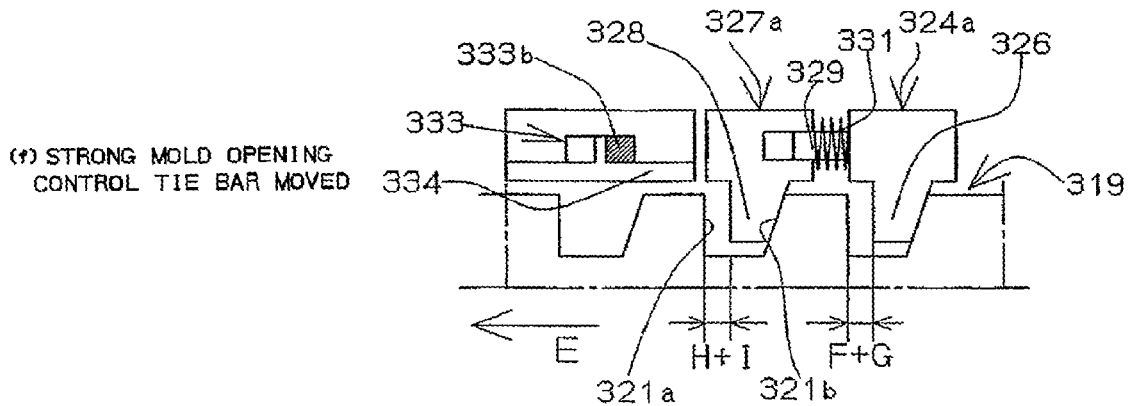

With regard to the operation of the mold clamping unit, FIGS. 5A, 5B, and 5C each illustrate the operation in a first half of processes in the first embodiment. FIGS. 5D, 5E, and 5F each illustrate the operation in a second half of the processes in the first embodiment. The operation of the mold clamping unit 3 starts when a command signal is transmitted from the control unit 343 to the servo amplifier 342, the hydraulic unit 320, or others. The movable platen 314 has been drawn away and is in a mold open state. First, the servo motor 338 of the mold opening/closing mechanism 315 is operated to rotate the ball screw 340 so that the ball screw nut 341, in which the ball screw 340 is inserted, moves in the mold opening/closing direction. As a result, the movable platen 314 and the movable mold 313, each stopped at the mold open position, move toward the stationary platen 312 and the stationary mold 311. With regard to a relationship between the nut members as the first engagement member 324 and the nut members as the second engagement member 327 during the period, as illustrated in FIG. 5A, the force transmission member 334 of the hydraulic cylinder 333 as the drive mechanism has been drawn away, causing the abutting surface 337 as the tip surface thereof to be spaced from the side surface 327a2 of the second engagement member 327a, the side surface 327a2 located farther from the movable platen. Note that, in a case where the actuator as the drive mechanism to cause the second engagement member 327a to be displaceable is the single acting cylinder, the abutting surface 337 of the force transmission member 334 and the side surface 327a2 of the second engagement member 327a are held abutting each other. In this state, with regard to a positional relationship between the second engagement member 327a and the first engagement member 324a, the spring 331 extends such that the second engagement member 327a and the first engagement member 324a are positioned at a maximum distance from each other.

Next, when the mold opening/closing mechanisms 315 have been operated to cause the movable mold 313 to about the stationary mold 311, the cavity C for molding is formed between the stationary mold 311 and the movable mold 313 (mold closing process). When the movable mold 313 and the stationary mold 311 have abutted each other, the servo motors 338 of the mold opening/closing mechanisms 315 are servo-locked, so that the position of the movable platen 314 is held. Then, the hydraulic cylinders 325 are operated to cause the first engagement members 324a and 324b of the engagement mechanism 323 to advance from the positions before the nut is inserted, i.e., the positions illustrated in FIG. 5A. As a result, the engagement teeth 326 of the first engagement member 324 engage with the engagement grooves 321 of the tie bar 319, thereby causing the movable platen 314 to engage with the tie bar 319. In this state, as illustrated in FIG. 5B, the mold clamping-side abutting surface 326a of the engagement teeth 326 of each of the first engagement members 324a and 324b and the mold clamping-side abutting surface 321a of the engagement grooves 321 of the tie bar 319 have a small gap F therebetween, and the strong mold opening-side abutting surface 326b of the engagement teeth 326 and the strong mold opening-side abutting surface 321b of the engagement grooves 321 have a small gap G therebetween.

The first engagement member 324 and the second engagement member 327 are connected via the connecting guide bars 329. Thus, when the hydraulic cylinders 325 are operated to cause the first engagement member 324 to advance, the second engagement member 327 is caused to advance with the first engagement member 324. Consequently, the engagement teeth 328 of the second engagement member 327 engage with the engagement grooves 321 of the tie bar 319, thereby causing the movable platen 314 to engage with the tie bar 319. In this state, as illustrated in FIG. 5B, the mold clamping-side abutting surface 328a of the engagement teeth 328 of each of the second engagement members 327a and 327b and the mold clamping-side abutting surface 321a of the engagement grooves 321 of the tie bar 319 have a small gap H therebetween, and the strong mold opening-side abutting surface 328b of the engagement teeth 328 and the strong mold opening-side abutting surface 321b of the engagement grooves 321 have a small gap I therebetween.

Engagement Process by Engagement Mechanism

Next, when the hydraulic oil has been supplied to the mold clamping-side oil chamber 317a of the mold clamping cylinder 317 as the mold clamping mechanism 316, and when the tie bar 319 has been drawn in a direction of arrow B in FIG. 5C to increase the mold clamping pressure, as illustrated in FIG. 5C, the gap F between the mold clamping-side abutting surface 326a of each of the first engagement members 324a and 324b of the engagement mechanism 323 and the mold clamping-side abutting surface 321a of the tie bar 319 is eliminated, and the mold clamping-side abutting surface 326a abuts the mold clamping-side abutting surface 321a. On the other hand, the gap G between the strong mold opening-side abutting surface 326b of the engagement teeth 326 of the first engagement member 324a and the strong mold opening-side abutting surface 321b of the engagement grooves 321 of the tie bar 319 is increased to F+G. In this state, similarly to the first engagement member 324, the gap H between the mold clamping-side abutting surface 328a of each of the engagement teeth 328 of the second engagement member 327 and the mold clamping-side abutting surface 321a of the engagement grooves 321 of the tie bar 319 is eliminated; and then, the gap I between the strong mold opening-side abutting surface 328b of the engagement teeth 328 and the strong mold opening-side abutting surface 321b of the engagement grooves 321 is increased to H+I. Note that, the mold clamping-side abutting surfaces 328a of the engagement teeth 328 of the second engagement member 327 is smaller in a total area than the mold clamping-side abutting surfaces 326a of the engagement teeth 326 of the first engagement member 326. Accordingly, a major part of the mold clamping force is desirably designed to be transmitted to the movable platen 314 via the mold clamping-side abutting surfaces 326a of the engagement teeth 326 of the first engagement member 324. The pressure in the mold clamping cylinder 317 is further increased and consequently, the stationary mold 311 and the movable mold 313 are clamped.

Mold Clamping Pressure Increasing Process

When the mold clamping force has reached a predetermined level, the operation proceeds to a mold clamping process, and a molten resin for foam molding is injected from the injection unit 4 toward the cavity C (mold clamping process). In the mold clamping process, each of the servo motors 338 of the mold opening/closing mechanisms 315 is in a no-load state. Then, in a predetermined period of time after the injection, the mold clamping-side oil chamber 317a of each of the mold clamping cylinders 317 is connected to a drain, and the pressure of the hydraulic oil in the mold clamping-side oil chamber 317a is reduced to zero.

Pressure Release Process

In this embodiment, from start of the mold clamping process until completion of the pressure release process, as illustrated in FIG. 5D, the hydraulic oil is supplied to the forward oil chamber 333a of the hydraulic cylinder 333 as the actuator to move the engagement member 327, such that the force transmission member 334 is drawn to abut the side surfaces 327a2 and 327b2 of the second engagement members 327a and 327b as the nut members of the second engagement member 327, and then is further drawn in the same direction. As a result, the drawing force of the hydraulic cylinder 333 is transmitted to the second engagement members 327a and 327b via the force transmission member 334, causing the second engagement members 327a and 327b to move toward the first engagement members 324a and 324b. In this state, the second engagement members 327a and 327b are respectively connected to the first engagement members 324a and 324b via the connecting guide bars 329 inserted in the guide holes 330. Thus, the second engagement members 327a and 327b respectively move in the axial direction L of the tie bar 319 with respect to the first engagement members 324a and 324b. Concurrently, the distance between the first engagement member 324a and the second engagement members 327a as well as the distance between the first engagement member 324b and the second engagement member 327b is reduced, causing the springs 331 to contract.

When only the second engagement members 327a and 327b move, the strong mold opening-side abutting surface 328b of the engagement teeth 328 of each of the second engagement members 327a and 327b is caused to abut and be pressed against the strong mold opening-side abutting surface 321b of the tie bar 319. When the strong mold opening-side abutting surface 328b is pressed against the strong mold opening-side abutting surface 321b, the mold clamping-side abutting surface 321a of the tie bar 319 is pressed against the mold clamping-side abutting surface 326a of the engagement teeth 326 of the first engagement member 324, thereby eliminating the backlash between the engagement mechanism 323 and the engagement grooves 321 of the tie bar 319. With this configuration, the movable platen 314 and the tie bar 319 are fixedly connected without the backlash therebetween. Needless to say, the second engagement member 327 is concurrently operated to move toward each of the four tie bars 319, so that the four tie bars 319 and the movable platen 314 are engaged and fixed without the backlash therebetween.

When the pressure release process has completed, the operation proceeds to a core back control process as illustrated in FIG. 5E. The core back control process presumably includes a plurality of control methods. In a first core back control method, only the four tie bar moving mechanisms 345 are operated to cause the tie bars 319 to move in the mold opening direction (a direction of arrow D in FIG. 5E) toward the target positions. As a result, the movable platen 314 and the movable mold 313, with which the tie bars 319 are substantially integrated without the backlash, are caused to move to the target positions. In the tie bar moving mechanisms 345, the tie bar moving cylinders 346 respectively cause the tie bars 319 to move under the closed-loop control. Here, the position sensors 350 respectively detect the positions of the tie bars 319, based on which the valves 344, e.g., the servo valves, are operated under the closed-loop control to control the movement of the tie bars 319. In the first core back control method, the servo motors 338 of the two mold opening/closing mechanisms 315 are in a free state when the core back control is carried out. This method is advantageous in causing the movable mold 313 to move while maintaining parallelism of the movable mold 313 to the stationary mold 311.

In a second core back control method, only the servo motors 338 of the two mold opening/closing mechanisms 315 are operated to cause the movable platen 314 and the movable mold 313, with which the tie bars 319 are substantially integrated without the backlash, to move to the target positions. In the second core back control method, the servo motors 338 of the two mold opening/closing mechanisms 315, which are relatively strong and highly capable in control of positions, are used when the core back control is carried out. However, when the number of the servo motors 338 of the mold opening/closing mechanisms 315 is not four, the parallelism of the movable mold 313 to the stationary mold 311 may not be as accurate as the parallelism in the first core back control method.

In a third core back control method, the four tie bar moving mechanisms 345 and the servo motors 338 of the two mold opening/closing mechanisms 315 are operated, so as to cause the movable platen 314 as well as the tie bars 319 integrated with the movable platen 314 to concurrently move. In the third core back control method, the servo motors 338 of the two mold opening/closing mechanisms 315, which are relatively strong and highly capable in control of positions, are used. Concurrently, the four tie bar moving mechanisms 345 are used, so that the parallelism of the movable mold 313 to the stationary mold 311 is controlled. In the third core back control method, alternatively, only the four tie bar moving mechanisms 345 or only the servo motors 338 of the two mold opening/closing mechanisms 315 may be operated to control some of the core back sections.

Core Back Process

In any one of the core back control methods, when the pressure release process has completed, the tie bars 319 and the movable platen 314 are integrally fixed and are not affected by the backlash. Accordingly, it is possible to perform highly accurate core back molding (foam molding in this embodiment) in a speedy manner. When the core back control process has completed, the operation proceeds to a cooling process. In the cooling process, basically, the movable platen 314 is held at the target position and concurrently, the tie bars 319 are also held at the target positions for a predetermined period of time. Note that, in a case of cooling shrinkage of the resin in the cavity C, the hydraulic oil may be supplied to the mold clamping-side oil chambers 317a of the mold clamping cylinders 317 or rear oil chambers of the tie bar moving cylinders 346, so as to cause the tie bars 319 to move rearward. Alternatively, the servo motors 338 of the mold opening/closing mechanisms 315 may also be moved to the mold closing side such that the movable platen 314 and the movable mold 313 are pressed in the mold closing direction.

Cooling Process

When the cooling process has completed, as illustrated in FIG. 5F, the hydraulic oil is supplied to the rear oil chamber 333b of the hydraulic cylinder 333 as the actuator, i.e., the drive mechanism to cause the second engagement member 327 to be displaceable, so that the force transmission member 334 is drawn away (from the second engagement member 327). Consequently, the spring 331 between the first engagement member 324a and the second engagement member 327a and the spring 331 between the first engagement member 324b and the second engagement member 327b extend, thereby causing the second engagement members 327a and 327b to move away from the first engagement members 324a and 324b in the axial direction L of the tie bar 319.

Next, the hydraulic oil is supplied to the strong mold opening-side oil chamber 317b of the mold clamping cylinder 317 to perform a strong mold opening process. This configuration causes the tie bar 319 to move in the mold opening direction (a direction of arrow E in FIG. 5F), so that the strong mold opening-side abutting surfaces 321b of the engagement grooves 321 of the tie bar 319 abut the strong mold opening-side abutting surfaces 326b of the first engagement member 324 of the engagement mechanism 323. Further, due to the hydraulic oil supplied to the strong mold opening-side oil chamber 317b, the tie bar 319 pushes the engagement mechanism 323 and the movable platen 314 in the direction of arrow E to perform the strong mold opening process. As a result, the stationary mold 311 and the movable mold 313 are positioned at a predetermined distance from each other. In this state, the strong mold opening-side abutting surfaces 328b of the second engagement member 327 are held abutting the strong mold opening-side abutting surfaces 321b of the tie bar 319. However, in the strong mold opening, the major part of the mold opening force from the tie bar 319 is transmitted through the first engagement member 324 to the movable platen 314. Note that, the strong mold opening process is not necessarily required. Thus, in a case where the mold release force is not really required, when the engagement mechanisms 323 have moved away after the cooling process, the servo motors 338 of the mold opening/closing mechanisms 315 may be operated to cause the movable platen 314 to move in the mold opening direction.

Strong Mold Opening Process

Next, when the distance between the stationary mold 311 and the movable mold 313 has been increased to a predetermined one, the hydraulic cylinders 325 as the actuators, i.e., the drive mechanisms to cause the engagement mechanisms 323 to move in the opening/closing direction, are operated to cause the engagement mechanisms 323 to retreat. As a result, in each of the engagement mechanisms 323, the first engagement member 324a and the second engagement member 327a connected to each other, as well as the first engagement member 324b and the second engagement member 327b connected to each other, move away from the engagement grooves 321 of the tie bar 319. In this state, the force transmission member 334 is not directly fixed via a bolt or others to the side surface 327a2 of the second member 327a and the side surface 327b2 of the second engagement member 327b. With this configuration, regardless of the position of the force transmission member 334 of the hydraulic cylinders 333, the second engagement members 327a and 327b respectively move in the direction away from the engagement grooves 321. Subsequently, the servo motors 338 of the mold opening/closing mechanisms 315 are operated to cause the movable platen 314 and the movable mold 313 to move to positions where the mold opening completes. Next, the foam molded product molded in an operation of an ejector mechanism (not illustrated) is ejected from the cavity surface of the movable mold 313 and is taken out using a molded product extraction unit (not illustrated). Here, the positional relationship between the tie bar 319, the first engagement member 324, and the second engagement member 327 is in the state of FIG. 5A, and in this state, the operation proceeds to the next molding cycle.

Figure 6:
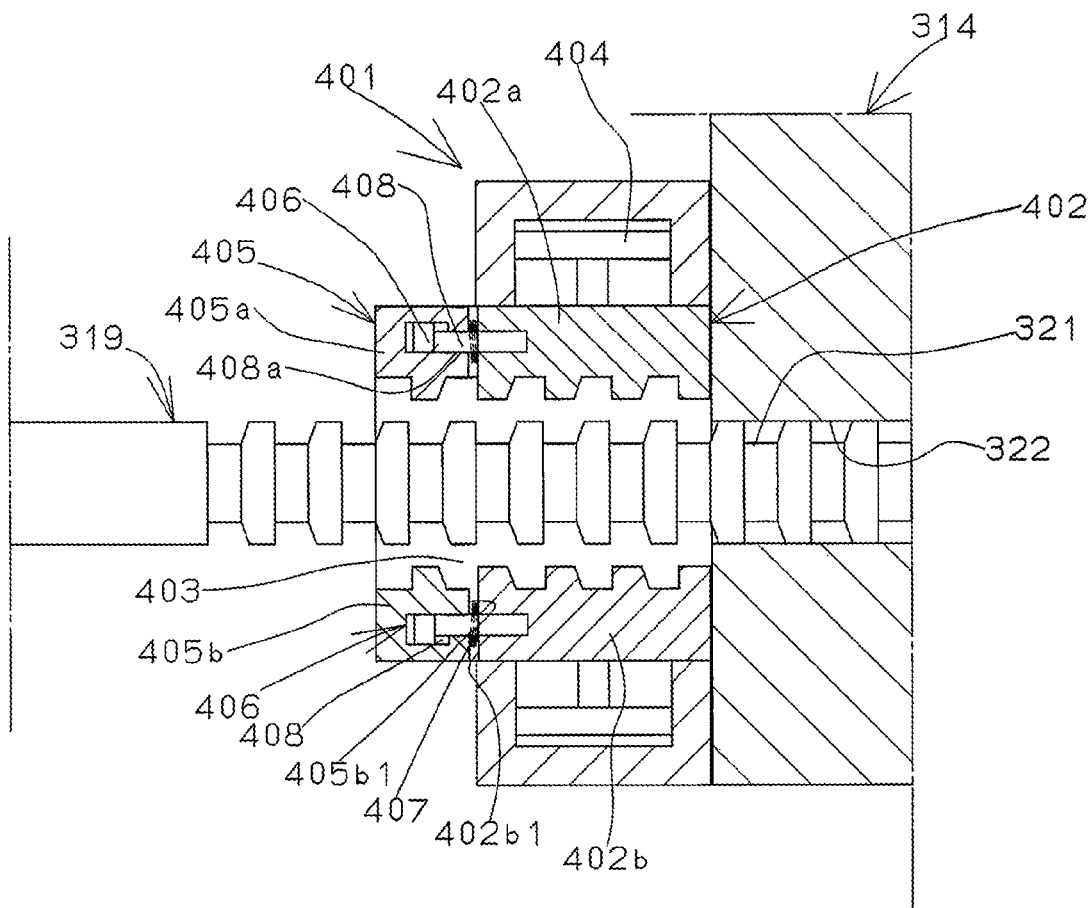
FIG. 6 is an enlarged view of a main part of an injection molding machine according to a second embodiment.

FIG. 6 is an enlarged view of a main part of an injection molding machine according to a second embodiment. The injection molding machine according to the second embodiment will be described with reference to FIG. 6 where similar elements to those described in the first embodiment are denoted with the same reference signs. In the second embodiment, the movable platen 314 has, at its back surface, an engagement mechanism 401 attached. The engagement mechanism 401 includes, in a case 403 including holding members, actuators 404 as drive mechanisms to cause first engagement members 402a and 402b as nut members of a first engagement member 402 to move only in a direction closer to or away from the engagement grooves 321 of the tie bar 319. Further, in the case 403, the actuators 404 cause a second engagement member 405, together with the first engagement member 402, to move in the direction closer to or away from the engagement grooves 321 of the tie bar 319.

The second engagement member 405 includes, as its nut members, second engagement members 405a and 405b that are displaceable in the axial direction L of the tie bar 319 with respect to the first engagement member 402. Specifically, the second engagement member 405, i.e., the second engagement members 405a and 405b, respectively have hydraulic cylinders 406 therein, and the hydraulic cylinders 406 are actuators as drive mechanisms to cause the second engagement members 405a and 405b to respectively displace with respect to the first engagement members 402a and 402b. Each of the hydraulic cylinders 406 includes a force transmission member 407 having a cross section of substantially semicircular or circular arc shape with a predetermined thickness. The hydraulic cylinder 406 also has, on its outer circumference, a hydraulic oil chamber 408. Note that, the force transmission member 407 corresponds to a rod of a typical hydraulic cylinder.

The force transmission member 407 has the cross section M perpendicular to the axial direction L of the tie bar, and the cross section M desirably has an inner circumference 408a shaped similar to the outer circumferences of the engagement grooves 321 of the tie bar 319 (or desirably shaped the same in a case where tips of engagement teeth of the first engagement member 402 abut the bottom surfaces 321c of the engagement grooves 321 of the tie bar 319). When the force transmission member 407 has the cross section of substantially semicircular or circular arc shape, a center angle (an inner angle between two radial lines extending from a center point to both edges of the substantially semicircular or circular arc shape) is desirably 80 to 170 degrees. When the center angle is smaller than 80 degrees, the force transmission member 407 is not capable of pressing the second engagement member stably; and when the center angle is greater than 170 degrees, the wall surface is to be too thin, causing an influence on the strength of pressing the second engagement member. With the force transmission member 407 of the actuator 404 having this structure, the force transmission member 407 has an abutting surface, the area of which is secured. Accordingly, as compared with the case where one to three rods are used to press the second engagement member, the force transmission member 407 stably presses the second engagement member.

The hydraulic cylinder may be a single acting cylinder or a double acting cylinder. When the hydraulic cylinder is the single acting cylinder, between side surfaces 402b1 of the first engagement member 402 and side surfaces 405b1 of the second engagement member 405, the side surfaces 405b1 closer to the first engagement member 402, springs 409 are provided to cause the second engagement member 405 to return to the original position; or alternatively, springs are provided in the oil chambers to cause the second engagement member 405 to return to the original position. Further, as with the block 332 integrated with the movable platen 314 in the first embodiment, the springs may be located on a block provided at a position relatively away from the second engagement member 405 so as to apply spring force to the second engagement member 405 toward the movable platen 314. When the hydraulic cylinder 406 is the double acting cylinder, the first engagement member 402 includes a forward oil chamber, a piston, and a rear oil chamber therein. In this case, the double acting cylinder may have a tip of its rod engaged with the second engagement member 405. The actuator as the drive mechanism may be an electric motor.

Concurrently, between the holding members in the case 403 fixed to the movable platen 314, the second engagement member 405, together with the first engagement member 402, is configured to move in the direction closer to or away from the engagement grooves 321 of the tie bar 319. As has been described above, the hydraulic cylinder 406 is operated to cause the second engagement member 405 to move in the axial direction L of the tie bar 319 to be closer to or away from the first engagement members 402. However, the second engagement member 405 may include a dedicated actuator. In this case, the abutting surface as a tip of the force transmission member 407 of the hydraulic cylinder 406 may not be directly fixed to but simply abut a side surface 405a1 of the second engagement member 405.

With the mechanisms described above, the nut members as the second engagement member 405 are displaceable in the axial direction L of the tie bar 319 with respect to the nut members as the first engagement member 402, and concurrently, the nut members as the second engagement member 405 are movable to be closer to or away from the engagement grooves 321 of the tie bar 319. Note that, the hydraulic cylinder 406 may be included in the first engagement members 402a and 402b, and the force transmission members may be positioned toward the second engagement member 405. When the actuator is included in the first engagement member 402, the tip of the force transmission member may abut or engage with the side surface of the second engagement member 405. When the actuator as the drive mechanism is the double acting cylinder or the electric motor, and when the tip of the force transmission member engages with one of the engagement members, the backlash in the engagement mechanism may be removed by force that is transmitted from the actuator via the force transmission member to the one of the engagement members, the force pushing the one of the engagement members toward the other of the engagement members.

While not illustrated, the second engagement member 327 may be located between the movable platen 314 and the first engagement member 324. In this case, when the pressure release process has completed, the actuators of the present invention are operated to cause only the second engagement member 327 to move in the mold closing direction. With this configuration, the strong mold opening-side abutting surfaces 328b of the second engagement member 327 abut and press the strong mold opening-side abutting surfaces 321b of the engagement grooves 321 of the tie bar 319, so that the backlash is removed.

Figure 7:
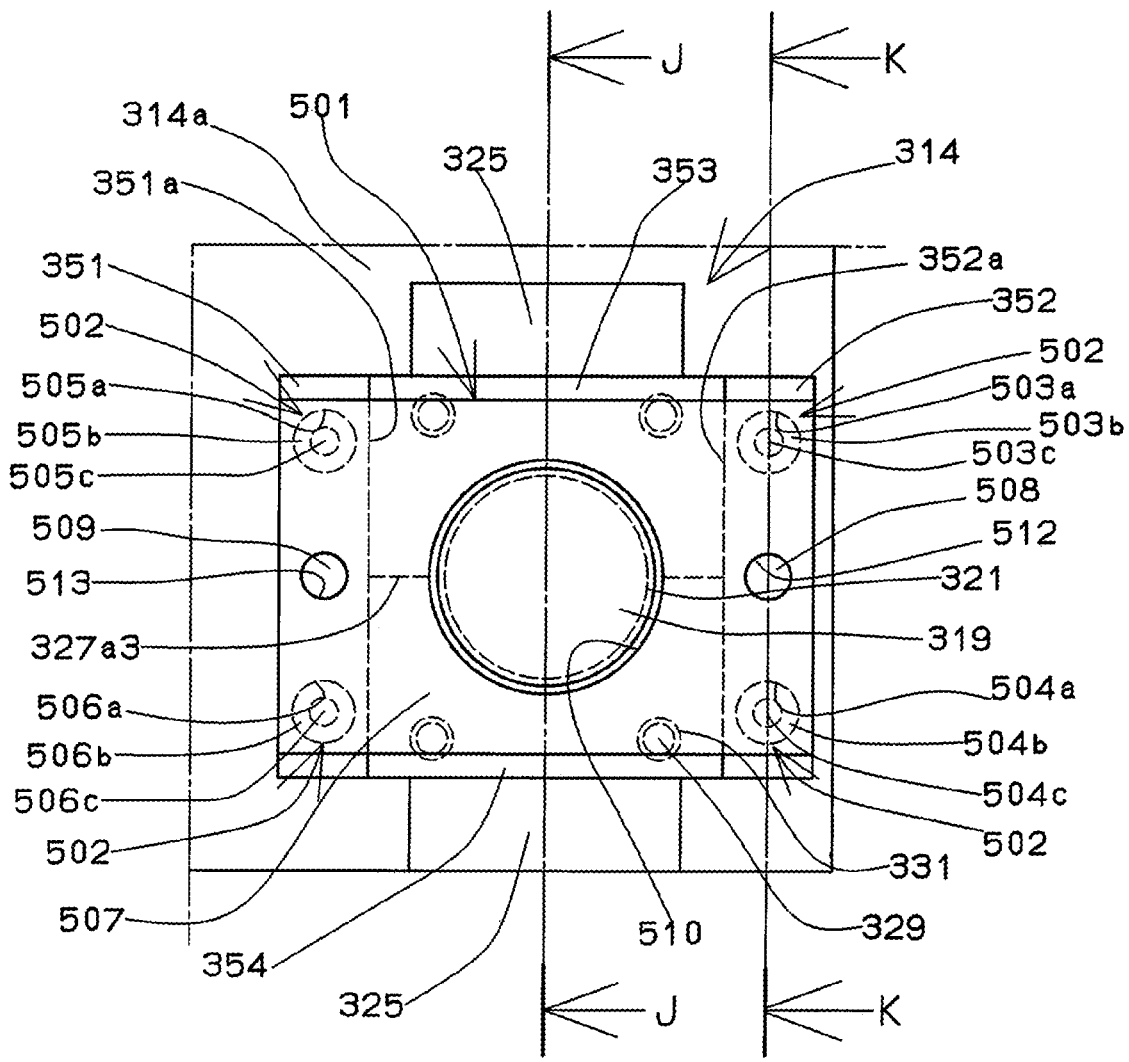
FIG. 7 is an enlarged view of a main part of an injection molding machine according to a third embodiment, and similarly to FIG. 4, is a view when viewed in the direction of A in FIG. 1.

Next, a third embodiment will be described with reference to FIGS. 7 to 10. An injection molding machine 1 according to the third embodiment includes a mold clamping unit 3 and an injection unit 4, the major parts of which are similar to those described in the first embodiment with reference to FIG. 1 and are thus denoted with the same reference signs; and here, only different points will be described. As illustrated in FIG. 7, the holding members 351 and 352 as parts of a case, which accommodates an engagement mechanism 501 of the third embodiment therein, respectively have two of cylinder tubes 503a, 504a, 505a, and 506a of hydraulic cylinders 503, 504, 505, and 506 as drive mechanisms 502 configured to cause the second engagement member to be displaceable in the axial direction of the tie bar with respect to the first engagement member. The cylinder tubes 503a, 504a, 505a, and 506a respectively have pistons 503b, 504b, 505b, and 506b therein.

In this embodiment, the cylinder tubes 503a and others of the drive mechanisms 502 are provided in the holding members 351 and 352, but a commercially available hydraulic cylinder may be used instead. Note that, the number of the hydraulic cylinders as the drive mechanisms 502 is not limited, and each of the drive mechanisms 502 may be a donut-shaped hydraulic cylinder as illustrated in FIG. 4. Each of the hydraulic cylinders according to the third embodiment is a double acting cylinder, but may be a single acting cylinder including an oil chamber, to which the hydraulic oil is supplied, only at one side of the piston, and including a spring to cause the second engagement member to return to the original position. Further, each of the drive mechanisms 502 may be an electric drive mechanism such as a servo motor or a ball screw mechanism. As illustrated in FIG. 7, the holding members 352 and 351 respectively have guide bars 508 and 509 provided in parallel to the hydraulic cylinders 503, 504, 505, and 506, the guide bars 508 and 509 configured to guide a force transmission member 507 to move. The number of the guide bars 508 and 509 illustrated here is two, but is not limited thereto. In many cases, many more guide bars are actually used.

Figure 8:
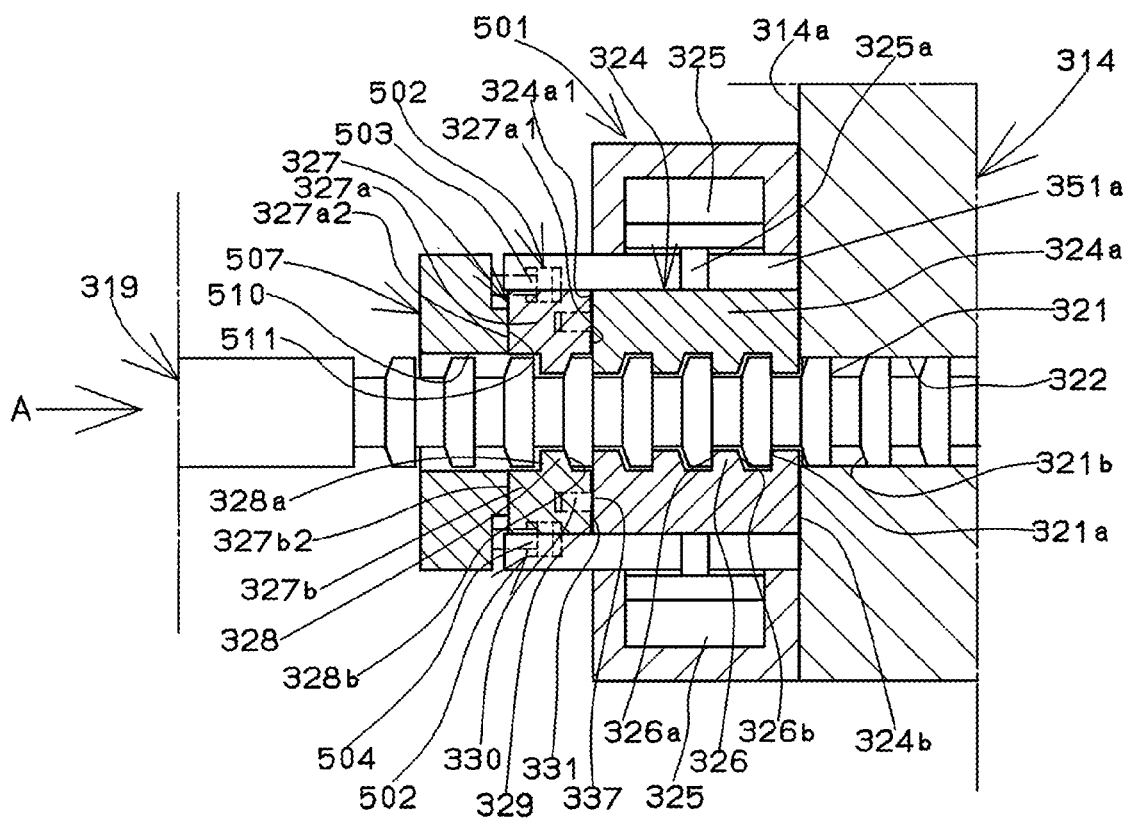
FIG. 8 is an enlarged view of the main part of the injection molding machine according to the third embodiment, and is a view on arrow J-J in FIG. 7.

In the third embodiment, the structures of the first engagement member 324 and the second engagement member 327 as the engagement mechanism 501 as well as the actuators as the drive mechanisms to drive the engagement mechanism 501 in an opening/closing direction of the engagement mechanism 501 are the same as those described in the first embodiment, and thus a detailed description thereof will be omitted. FIG. 8 is a view on arrow J-J in FIG. 7, and the force transmission member 507 is located opposite the first engagement member 324 across the second engagement member 327 (located on the left in FIG. 8, i.e., on the side farther from the movable platen). The force transmission member 507 is a single block object having, for example, a rectangular parallelepiped, a polyhedral, or a cylindrical shape. The force transmission member 507 includes, in its center in the axial direction of the tie bar, a through hole 510 of a cylindrical shape, the through hole 510 in which the tie bar is inserted. The force transmission member 507 also includes a pressure surface 511 closer to the second engagement member 327. The pressure surface 511 of the force transmission member 507 according to the third embodiment is a flat surface perpendicular to the axial direction of the tie bar, but may alternatively have another shape as long as a constant area or more of the pressure surface 511 abuts the side surface 327a2 of the second engagement member 327, the side surface 327a2 as a surface to be pressed. In the third embodiment, each of the force transmission members 507 is the single block object but is not limited thereto, and a plurality of block objects may be applied instead.

Figure 9:
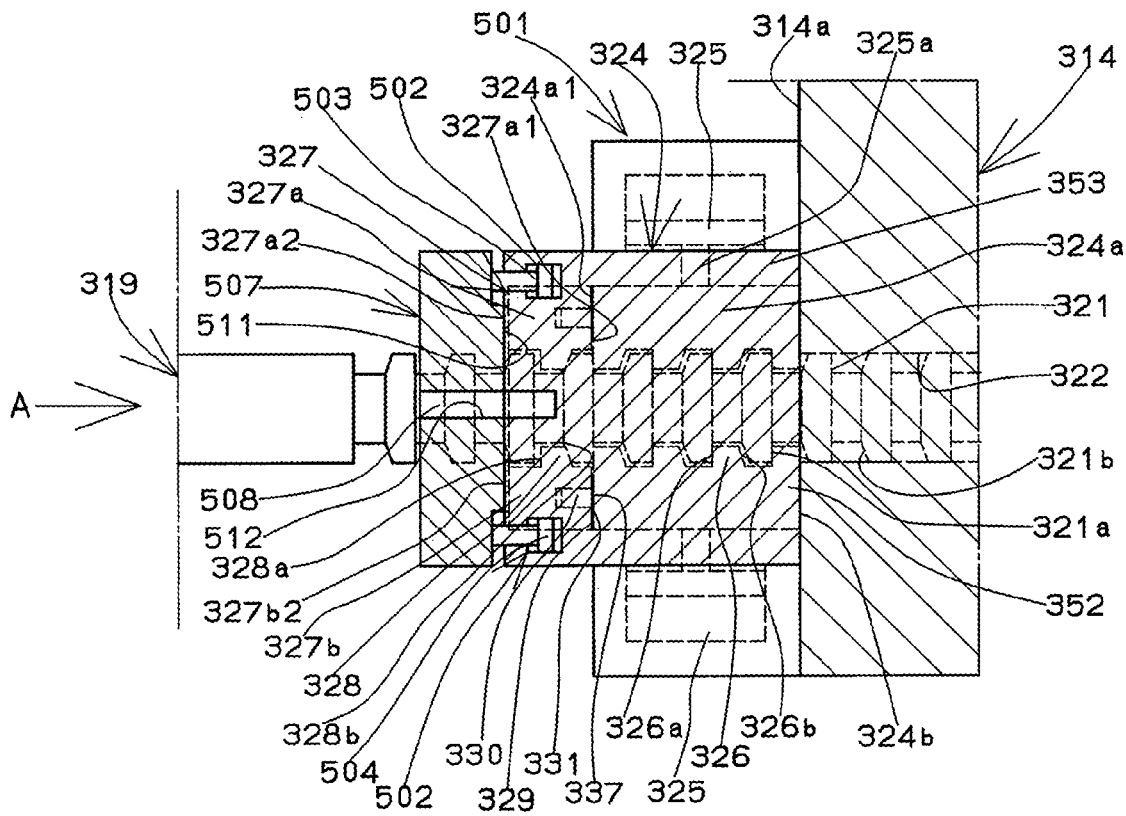
FIG. 9 is an enlarged view of the main part of the injection molding machine according to the third embodiment, and is a view on arrow K-K in FIG. 7.

FIG. 9 is a view on arrow K-K in FIG. 7, and is a cross sectional view taken along a plane perpendicular to the holding member 351. Note that, for convenience of description, the tie bar 319, the first engagement member 324, and the second engagement member 327, each not included in this cross sectional view, are also illustrated with broken lines. The force transmission member 507 has, in the axial direction of the tie bar, guide holes 512 and 513, in which the guide bars 508 and 509 are respectively inserted. The hydraulic cylinders 503, 504, 505, and 506 as the drive mechanisms 502, while attached to members such as the holding members 351 and 352 closer to the movable platen 314, respectively have rods 503c, 504c, 505c, and 506c attached to an outer periphery of the force transmission member 507 closer to the pressure surface 511. The pressure surface 511 may correspond to the area where the rods of the hydraulic cylinders 503 to 506 are attached (FIG. 7), or alternatively, the pressure surface 511 and the area where these rods are attached may be different in height. With the structure described above, the plurality of drive mechanisms 502 cause the force transmission member 507 as the block object to stably press the second engagement member 327 toward the first engagement member 324. Further, unlike JP 2009-132097 A, the rods of the drive mechanisms are not directly attached to the engagement member 327. Thus, the engagement member is not required to be changed in position with respect to the rods, which is advantageous in not having the complex structure.

Figure 10A:
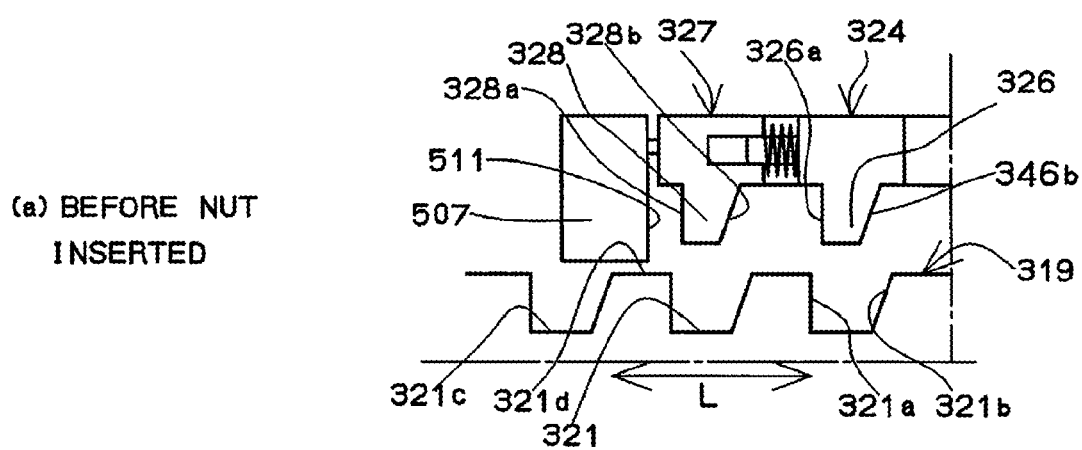
FIGS. 10A, 10B, 10C, 10D, 10E, and 10F each illustrate an operation in a first half of processes in the third embodiment.
Figure 10B:
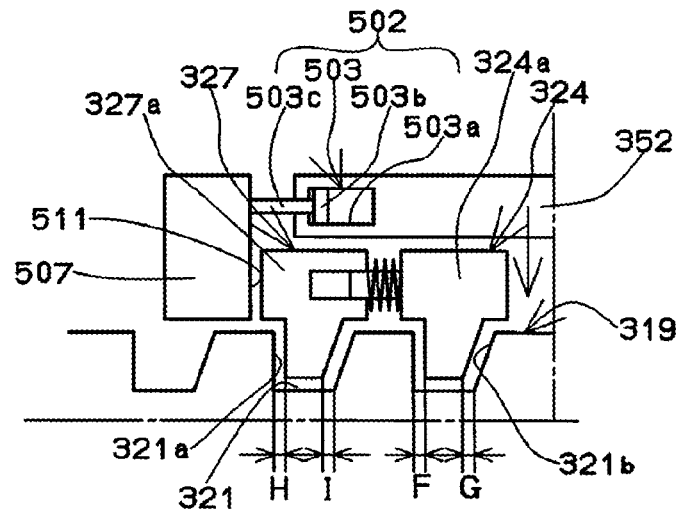
Figure 10C:
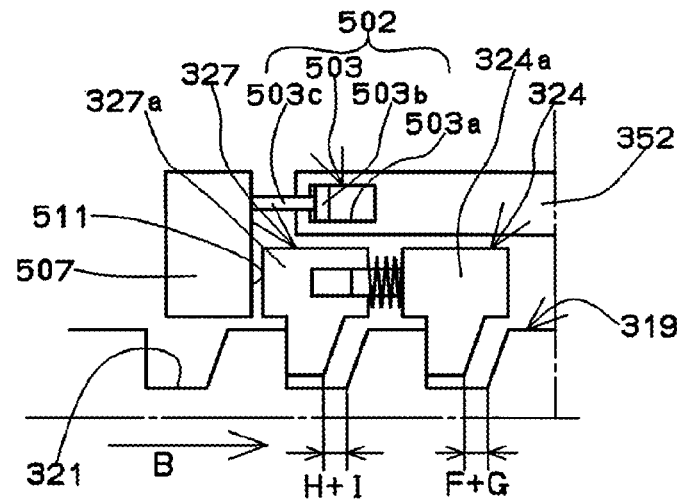

Method for Controlling Mold Clamping Unit and Method for Molding Foam Molded Product According to Third Embodiment Next, a method for molding a foam molded product in the injection molding machine 1 according to the third embodiment will be described with reference to FIGS. 10A, 10B, 10C, 10D, 10E and 10F. In the method for molding the foam molded product (core back control method) according to the third embodiment, an operational relationship between the first engagement member 324, the second engagement member 327, and the tie bar 319 is in common with that described in the first embodiment with reference to FIGS. 5A, 5B, 5C, 5D, 5E and 5E that illustrate the operations. As illustrated in FIG. 10B, i.e., a middle drawing of FIGS. 10A to 10C, when the nut has been inserted to cause the pair of the first engagement members 324a and 324b as the first engagement member 324 and the pair of second engagement members 327a and 327b as the second engagement member 327 to respectively engage with the grooves 321 of the tie bar 319, the mold clamping pressure increase is carried out as illustrated in FIG. 10C, i.e., a lower drawing of FIGS. 10A to 10C.

Figure 10D:
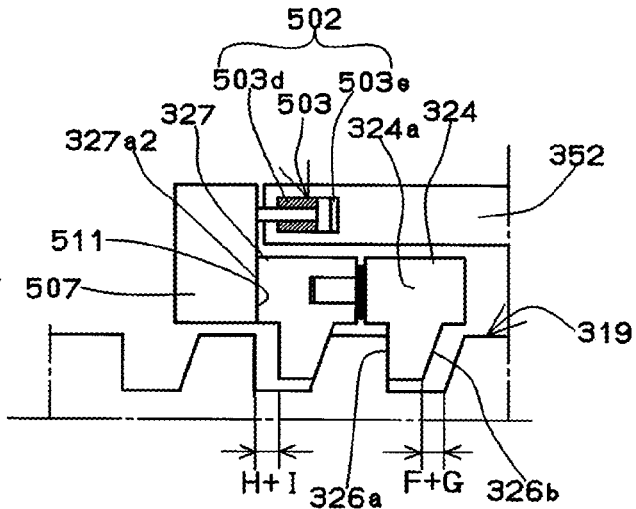
Figure 10E:
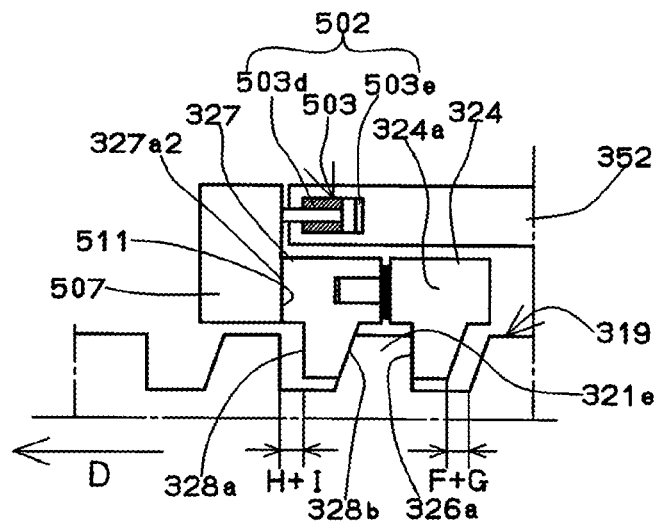
Figure 10F:
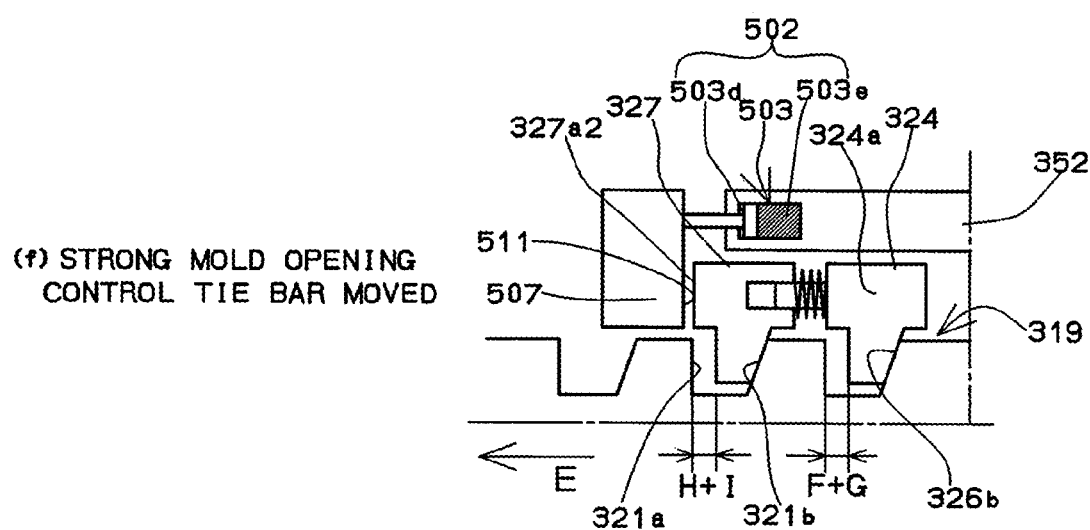

Next, as illustrated in FIG. 10D, i.e., an upper drawing of FIGS. 10D to 10F, when the mold clamping process has completed, the engagement members 327a and 327b as the second engagement member 327 move toward the engagement members 324a and 324b as the first engagement member 324. In this state, the hydraulic oil is supplied to rod-side oil chambers 503d and others that the hydraulic cylinders 503 and others as the drive mechanisms 502 include at front side. Then, the rods 503c and others are driven to move rearward and concurrently, the pressure surface 511 of the force transmission member 507 presses the side surfaces 327a2 of the second engagement members 327a and 327b as the second engagement member 327, the side surfaces 327a2 as the surfaces to be pressed. With this configuration, the engagement teeth 328 of the second engagement members 327a and 327b as the second engagement member 327 respectively move in the mold closing direction as much as the amount of the backlash in the grooves 321 of the tie bar 319. Consequently, the strong mold opening-side abutting surfaces 328b of the engagement teeth 328 abut the strong mold opening-side abutting surfaces 321b of the tie bar 319. The first engagement members 324a and 324b as the first engagement member 324 are configured not to move in the axial direction of the tie bar 319. Accordingly, the hydraulic cylinders 503 and others as the drive mechanisms are operated to cause the mold clamping-side abutting surfaces 326a of the engagement teeth 326 of the first engagement members 324a and 324b as the first engagement member 324 and the strong mold opening-side abutting surfaces 328b of the engagement teeth 328 of the second engagement members 327a and 327b as the second engagement member 327 to have projections 321e therebetween; and thus, the projection 321e is formed between an adjoining two of the grooves 321 of the tie bar 319. In this state, the backlash is removed and the engagement areas are fixed. Then, during the mold clamping pressure increase, the molten resin containing a foam material is injected from the injection unit 4 into the cavity of the mold (not illustrated). Note that, the pair of the second engagement members 327a and 327b as the second engagement member 327 only needs to move during the period between the start of the mold clamping process and the completion of the pressure release process.

In this state, the core back control is carried out as illustrated in FIG. 10E, i.e., a middle drawing of FIGS. 10D to 10F. Here, the tie bar moving cylinders 346 are operated to cause the tie bars 319 to move in the mold opening direction such that the core back control is carried out. Alternatively, the servo motors 338 of the mold opening/closing mechanisms 315 are driven. With this configuration, the movable platen 314 and the movable mold 313 move in the mold opening direction, so that the volume of the cavity C between the stationary mold 311 and the movable mold 313 is increased.

When the core back control process has completed, the operation proceeds to the strong mold opening control process as illustrated in FIG. 10F, i.e., a lower drawing of FIGS. 10D to 10F. In the strong mold opening control process, the hydraulic oil is supplied to cylinder-side oil chambers 503e and others of the hydraulic cylinders 503 and others as the drive mechanisms 502. Then, the rods 503c and others are driven to move forward and concurrently, the force transmission members 507 move in the mold opening direction (toward the left in FIG. 10D to 10F). Subsequently, the hydraulic oil is supplied to the strong mold opening-side oil chambers 317b of the mold clamping cylinders 317 to cause the tie bars 319 to move in the mold opening direction. With this configuration, a major part of the force from each of the tie bars 319 is applied to the first engagement members 324a and 324b as the first engagement member 324, thereby causing the movable platen 314 and the movable mold 313 to move in the mold opening direction. As a result, the molded product is ejected from the mold.

Other Embodiments

In the foregoing embodiments, the mold clamping cylinders 317 are provided on the stationary platen 312 and the tie bars 319 are continuously connected to the stationary platen 312, whereas the first engagement members 324 and the second engagement members 327 as the engagement mechanisms 323 are provided on the movable platen 314. Alternatively, the mold clamping cylinders may be provided on the movable platen and the tie bars may be continuously connected to the movable platen, whereas the first engagement members and the second engagement members as the engagement mechanisms may be provided on the stationary platen. In this case, the movable platen may be composed of two platens as a first movable platen and a second movable platen. The first movable platen may have the movable mold attached thereto, and the second movable platen may have the mold clamping cylinders attached thereto, whereas the first engagement members and the second engagement members as the engagement mechanisms may be provided on the stationary platen. Still alternatively, the tie bars may be continuously connected to the movable platen via nuts, whereas the mold clamping cylinders may be provided on the stationary platen and the first engagement members and the second engagement members as the engagement mechanisms may be also provided on the stationary platen.

When the second engagement members 327 are configured to engage with the four tie bars 319, in most cases, each of the second engagement members 327 is provided to a corresponding one of the four tie bars 319. Alternatively, the second engagement members 327 may not be provided to some of the tie bars 319. For example, when the mold opening/closing mechanisms 315 connected to lower parts of the movable platen 314 are configured to cause the movable platen 314 to move, an upper part of the movable platen 314 may be slower in moving forward. In this case, the second engagement members may be provided only to the tie bars 319 located at the upper parts of the movable platen 314. Each of the engagement mechanisms 323 may include not only the first engagement member 324 and the second engagement member 327 but also a third engagement member or others.

In a case where the molding machine according to the present invention uses a mold clamping unit of an injection molding machine, the method for molding products is applicable, not only to the core back control including the foam molding, but also to overall molding methods, where a relatively low mold clamping force causes the movable platen to move, such as injection compression molding, injection press molding, or degassing molding. In the case where the molding machine according to the present invention uses the mold clamping unit of the injection molding machine, a large mold clamping unit having clamping force of 10,000 kN or more, for example, is preferably used, while not limited thereto.

The molding machine may generally be applied to a molding machine where a molded product is molded between molds including flat plates, such as a press molding machine, a blow molding machine, a vacuum molding machine, a laminate molding machine, or a transfer molding machine. In any one of these molding machines, the mold opening/closing direction of the movable mold is not limited, and the movable mold may be opened/closed horizontally, perpendicularly, or in other directions.

Needless to say, the present invention is not limited to the foregoing embodiments and may be applied to modifications made by those skilled in the art on the basis of the meaning of the present invention, although not enumerated herein.

Moreover, in the present invention, a plurality of examples described in the foregoing embodiments and the modifications may be appropriately combined.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A molding machine provided with: a mold opening/closing mechanism configured to cause a movable platen, to which a movable mold is attached, to move in a mold opening/closing direction with respect to a stationary platen to which a stationary mold is attached; and a mold clamping mechanism configured to clamp the stationary mold and the movable mold, the molding machine comprising:
a tie bar connected continuously to any one of the stationary platen and the movable platen, and including an engagement groove;
a first engagement member configured to engage with or move away from the engagement groove of the tie bar;
a second engagement member configured to engage with or move away from the engagement groove of the tie bar, and configured to be displaceable in an axial direction of the tie bar;
a force transmission member that is provided opposite to the first engagement member, is not fixedly attached directly to the second engagement member, and moves in a direction that is parallel to the axial direction of the tie bar; and
a drive mechanism configured, when pressing the second engagement member via the force transmission member, to cause the second engagement member to be displaceable in the axial direction of the tie bar with respect to the first engagement member,
wherein, when the second engagement member is engaged with or moves away from the engagement groove of the tie bar, the force transmission member is retreated and the force transmission member and the second engagement member have a gap therebetween, or the abutting surface of the force transmission member abuts the second engagement member to be slidable and only the second engagement member is displaced,
wherein
the drive mechanism is fixedly attached to the stationary platen or the movable platen, and is
configured not to move in a direction to engage with the engagement groove of the tie bar, and
configured not to move in a direction to move away from the engagement groove of the tie bar.

2. The molding machine according to claim 1, wherein the force transmission member is formed of a single block including a pressure surface to press the second engagement member and a through hole in which the tie bar is inserted.

3. The molding machine according to claim 1, wherein the force transmission member has an abutting surface as a tip surface that is a flat surface parallel to a side surface of the second engagement member.

* * * * *